Figure 4:
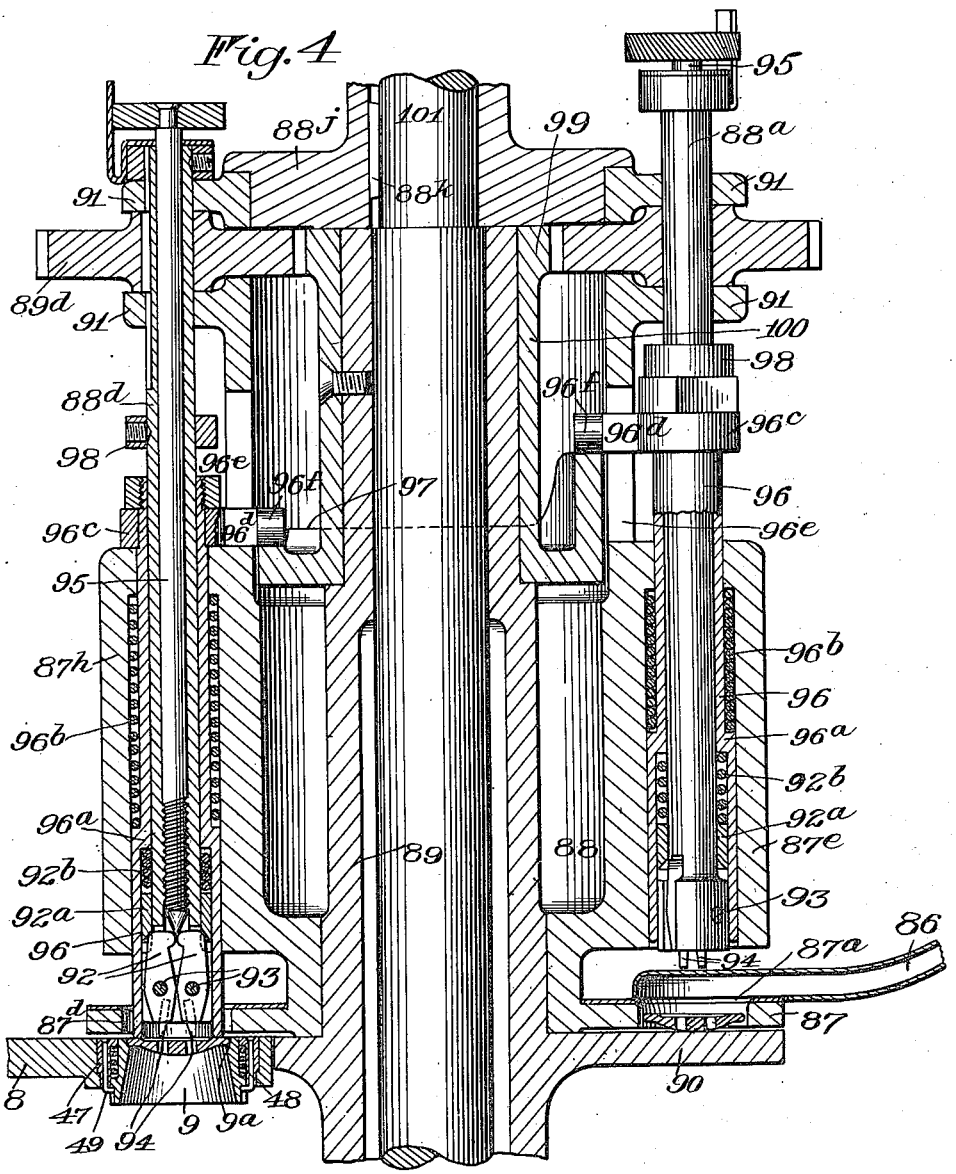

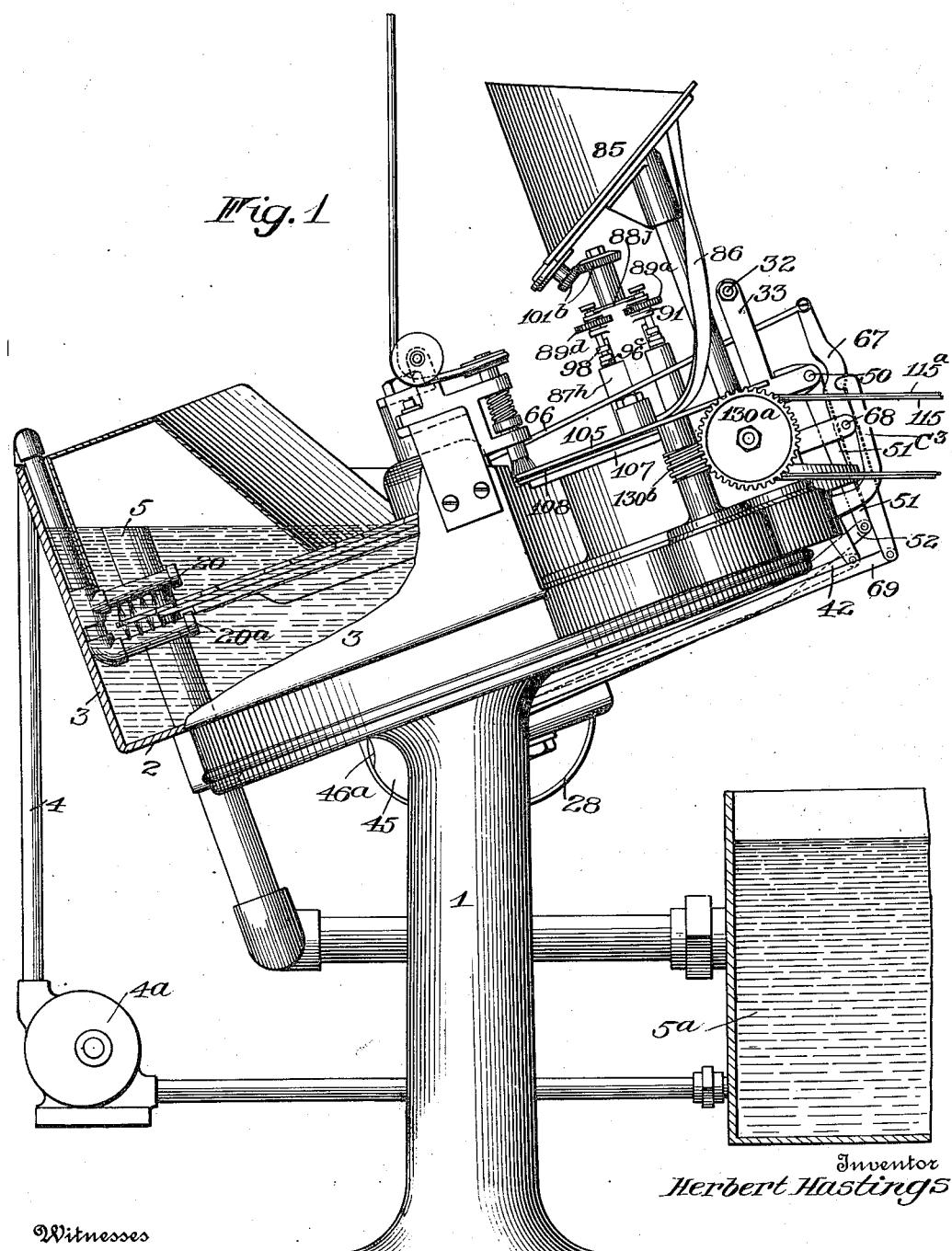

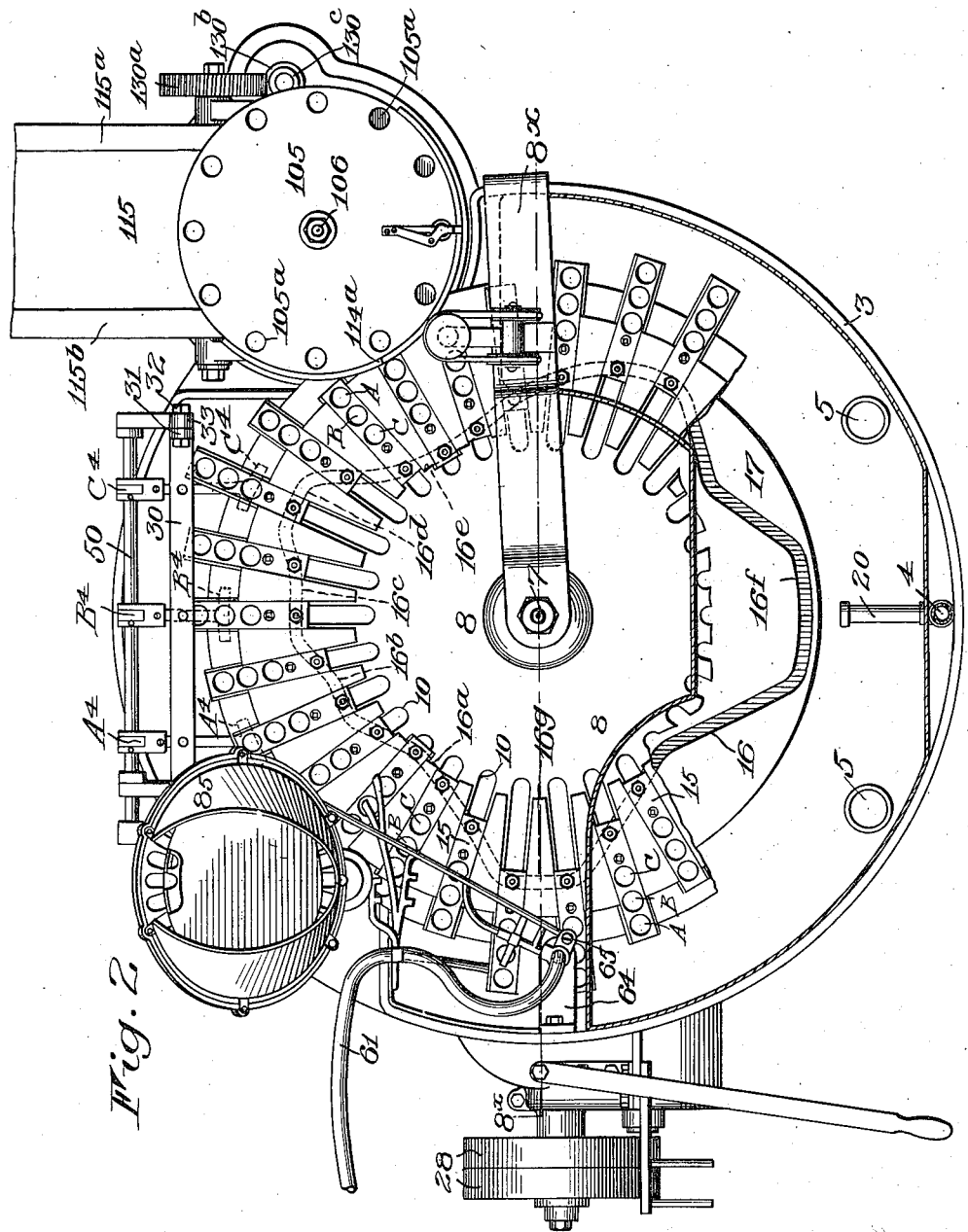

H. HASTINGS.
BUTTON STENCILING MACHINE.
APPLICATION FILED MAR. 2, 1912.
1,188,648.
Patented June 27, 1916.
10 SHEETS—SHEET 3.
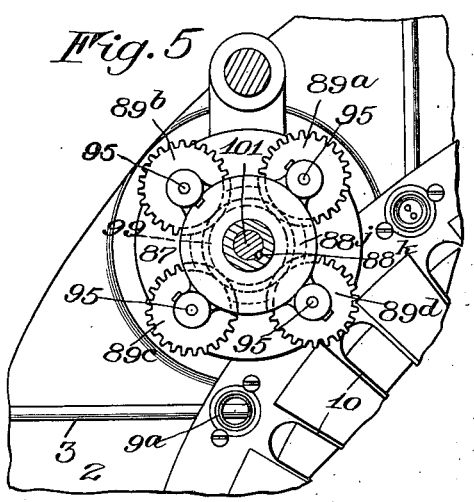
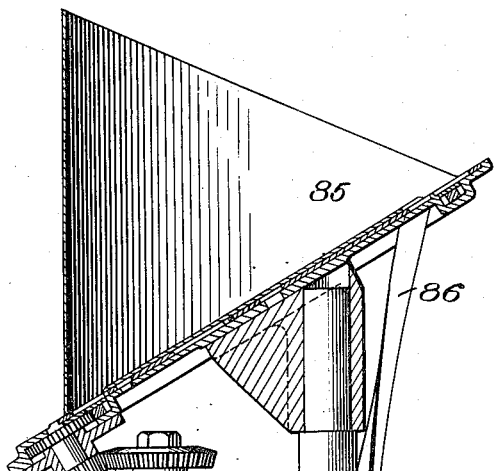
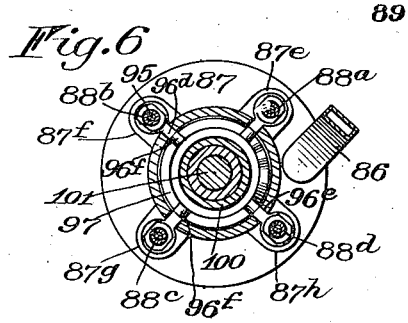
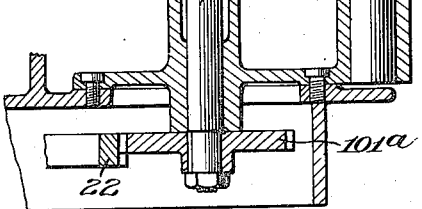
Inventor
Herbert Hastings

H. HASTINGS.
BUTTON STENCILING MACHINE.
APPLICATION FILED MAR. 2, 1912.

1,188,648.

Patented June 27, 1916.
10 SHEETS—SHEET 4.

WITNESSES:
Walter B. Payne
Nelson H. Copp

INVENTOR
Herbert Hastings
BY
Church & Rich
his ATTORNEYS

H. HASTINGS.
BUTTON STENCILING MACHINE.
APPLICATION FILED MAR. 2, 1912.
1,188,648.
Patented June 27, 1916.
10 SHEETS—SHEET 5.
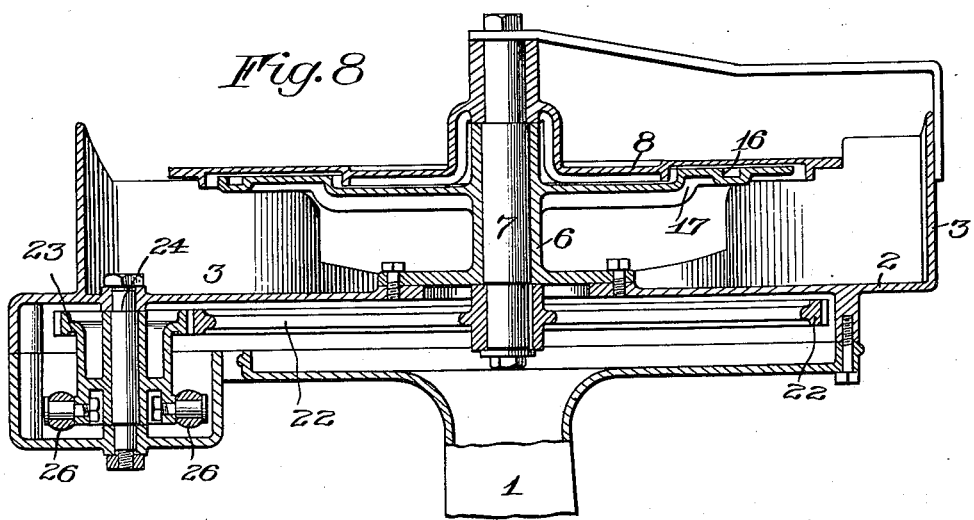
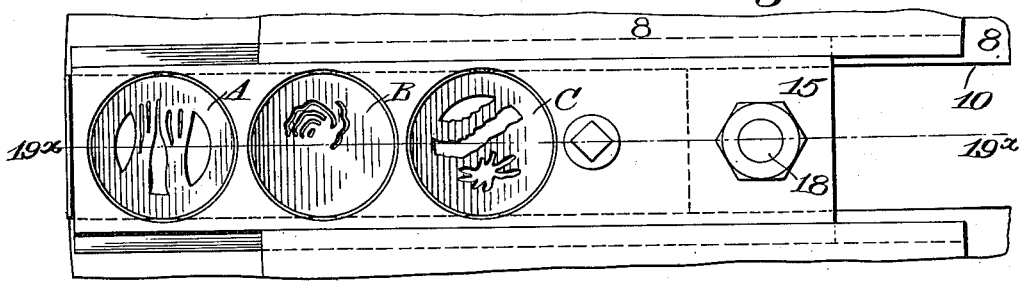
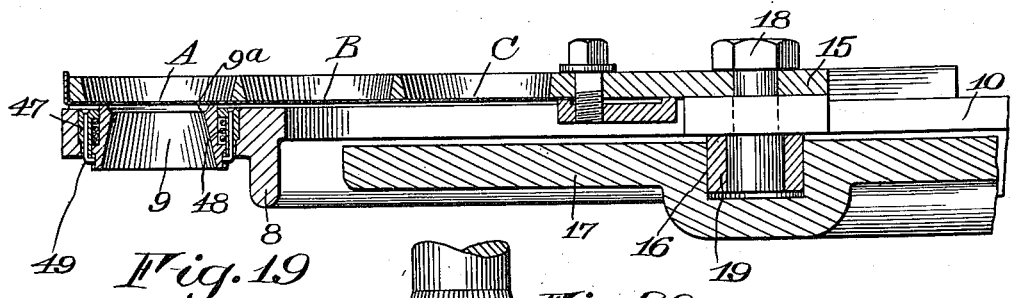
Inventor
Herbert Hastings
Witnesses
Walter B. Payne
Nelson H. Copp
By Samuel Fick
His Attorney

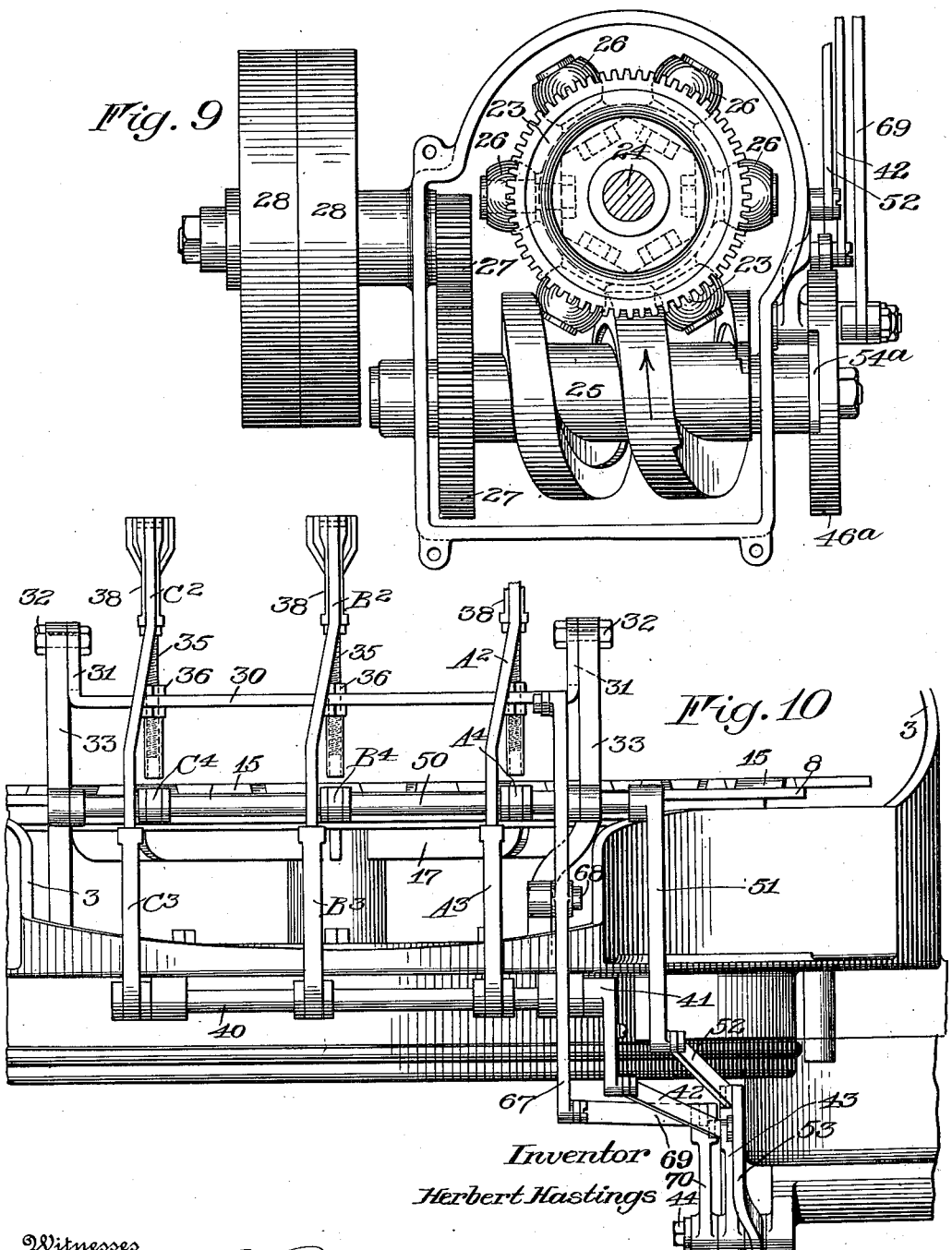

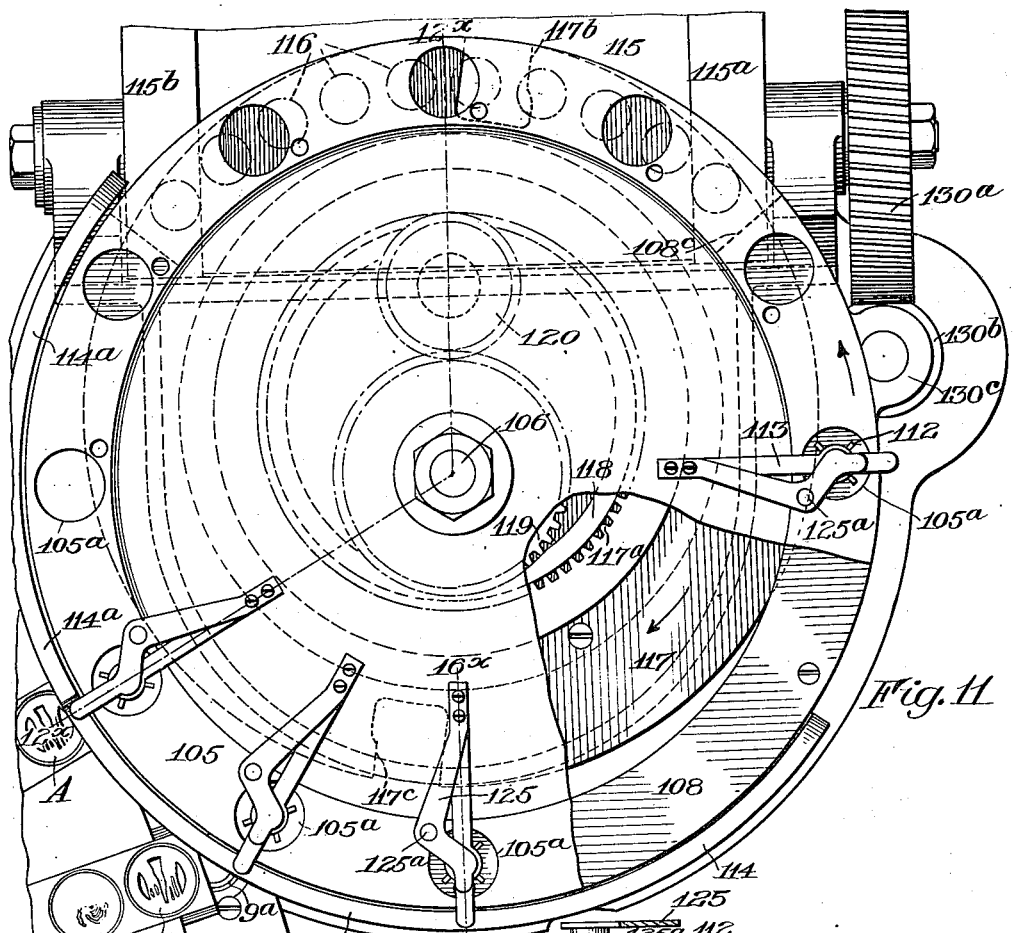
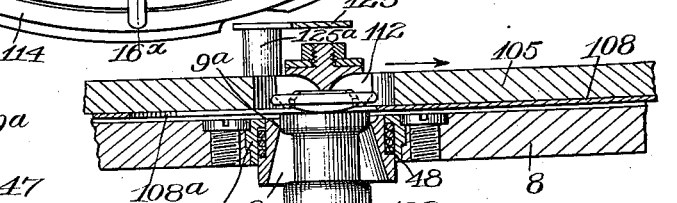
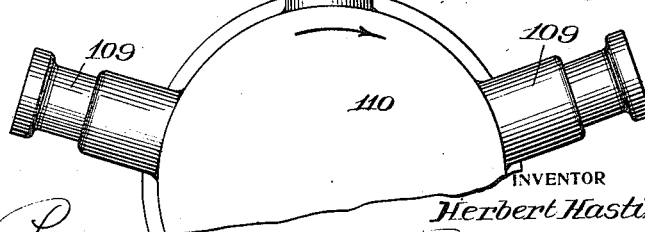

H. HASTINGS.
BUTTON STENCILING MACHINE.
APPLICATION FILED MAR. 2, 1912.
1,188,648.
Patented June 27, 1916.
10 SHEETS—SHEET 8.
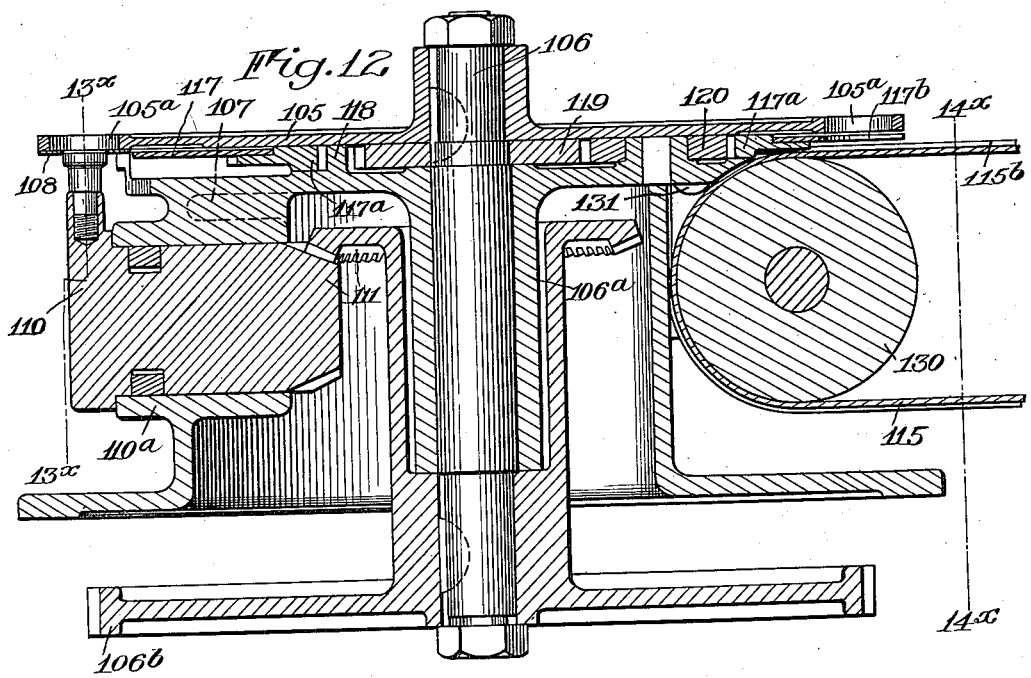
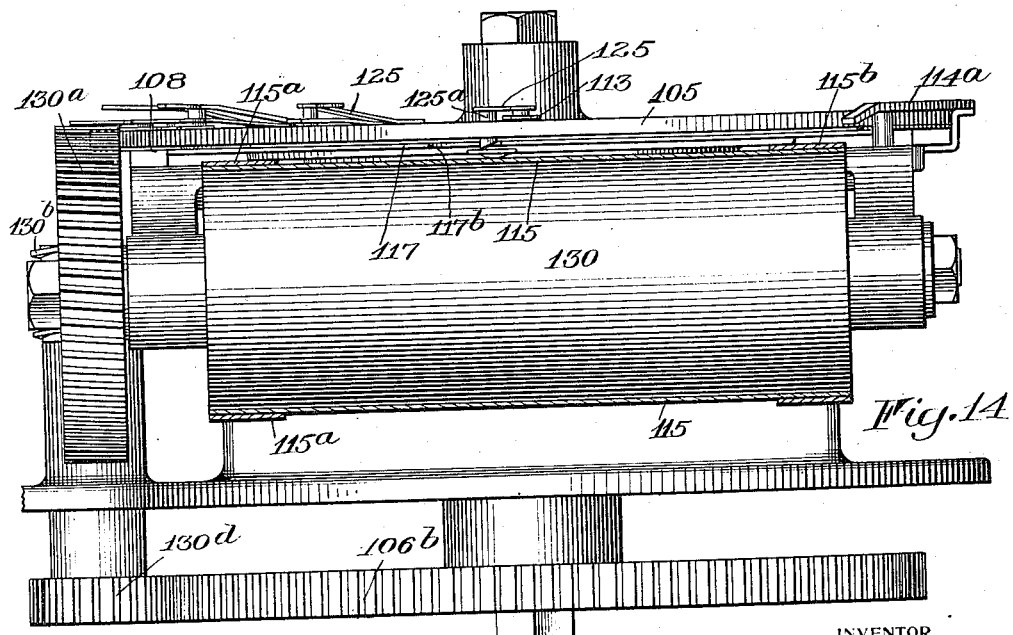
WITNESSES:
INVENTOR
Herbert Hastings
BY
his ATTORNEYS H. HASTINGS.
BUTTON STENCILING MACHINE.
APPLICATION FILED MAR. 2, 1912.
1,188,648.
Patented June 27, 1916.
10 SHEETS—SHEET 9.
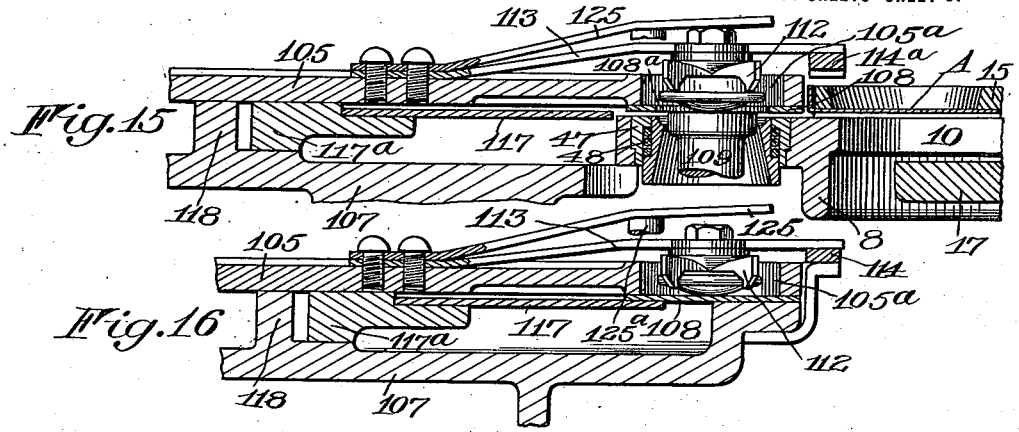
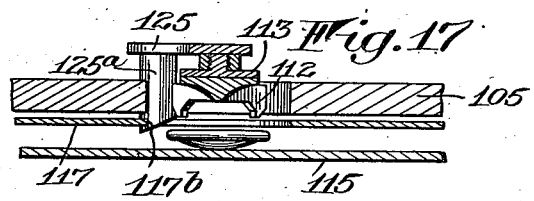
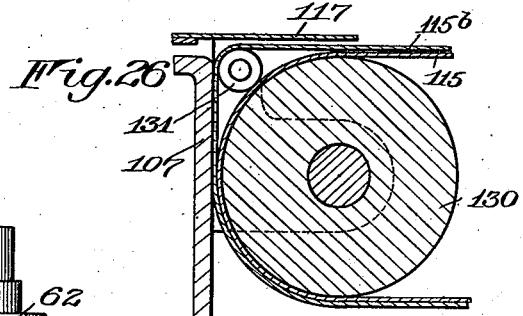
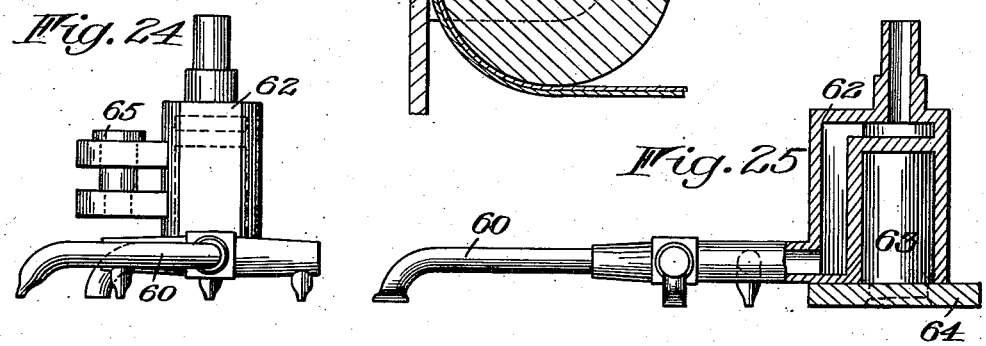

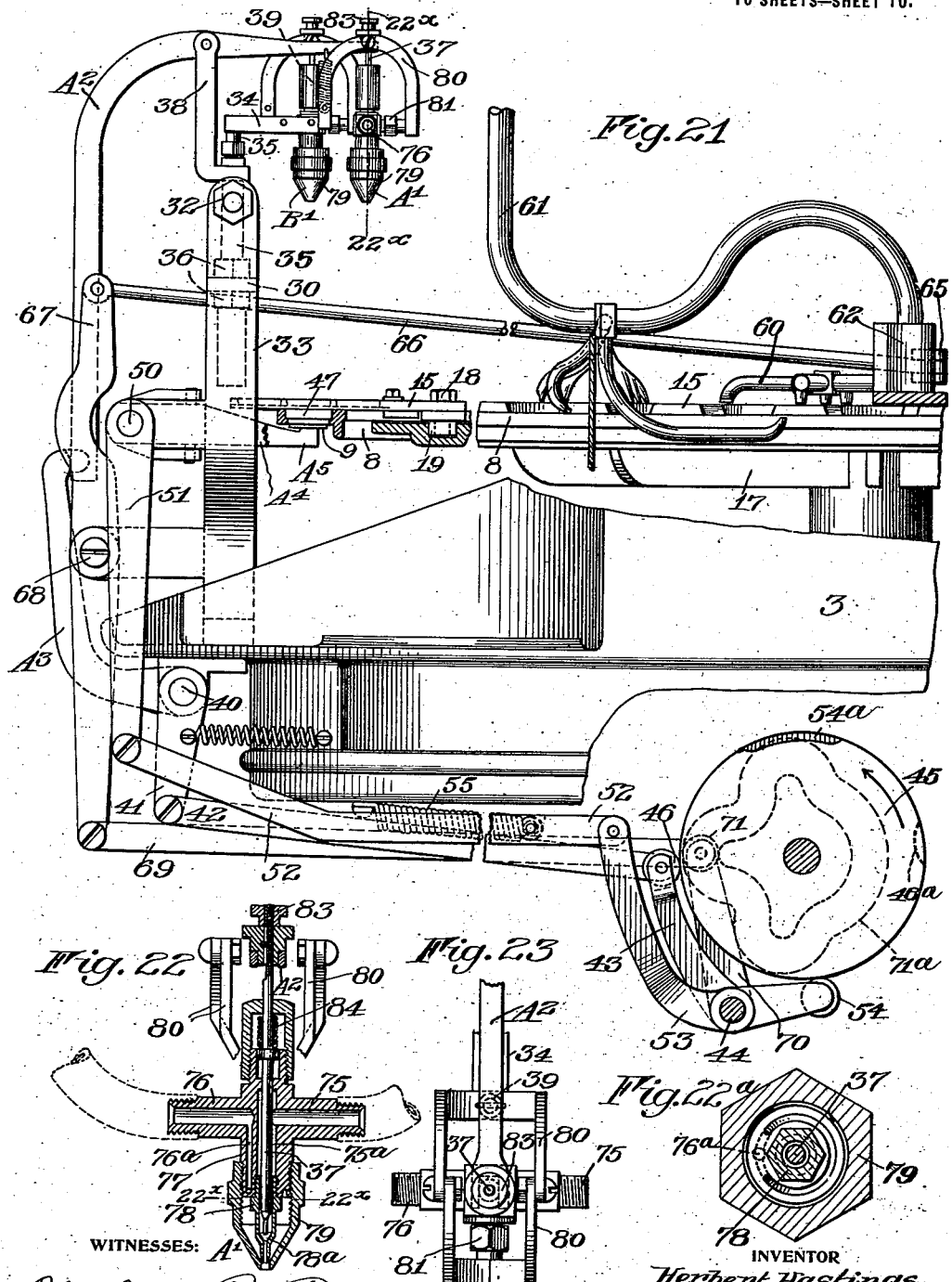

UNITED STATES PATENT OFFICE.

HERBERT HASTINGS, OF ROCHESTER, NEW YORK, ASSIGNOR TO GERMAN AMERICAN BUTTON COMPANY, OF ROCHESTER, NEW YORK, A CORPORATION OF NEW YORK.

BUTTON-STENCILING MACHINE.

1,188,648.        Specification of Letters Patent.     Patented June 27, 1916.

Application filed March 2, 1912. Serial No. 681,310.

*To all whom it may concern:*

Be it known that I, HERBERT HASTINGS, of Rochester, in the county of Monroe and State of New York, have invented certain new and useful Improvements in Button-Stenciling Machines; and I do hereby declare the following to be a full, clear, and exact description of the same, reference being had to the accompanying drawings, forming a part of this specification, and to the reference-numerals marked thereon.

My present invention has for its object to provide a machine for automatically performing the stenciling operations necessary in applying patterns or designs, in one or more colors, to buttons, particularly those made of vegetable ivory.

To this end my invention has for its further object to provide a machine in which the button blanks may receive one, or a plurality of superposed patterns, or stencilings, and at the completion of the operation be carried away, or transported, without coming in contact with each other or with other objects until after the stenciling fluid has become dry.

My invention has for its further object to provide devices for carrying the button blanks and the stencils in juxtaposition to each other during the period that the stenciling fluid is being applied, and at the completion of this operation to discharge or remove the button from the carrier and thereafter to submit the latter and the stencils to the action of chemical agents which will free them of all traces of the stenciling fluid, and then dry said parts in readiness to receive other button blanks.

Another feature of my invention resides in the mechanism by which the button blanks are placed in the pockets of the carrier successively and in like positions, thus assuring that the patterns will be positioned alike on all buttons either in reference to the perforations of the buttons or other characteristic features thereof.

Further, my invention comprehends a novel mechanism for applying the stenciling material.

To these and other ends the invention consists in certain improvements and combinations of parts all as will be hereinafter more fully described, the novel features being pointed out in the claims at the end of the specification.

In the drawings: Figure 1 is a side elevation partly in section of a button stenciling machine, constructed in accordance with my invention; Fig. 2 is a top plan view thereof; Fig. 3 is a side elevation of the devices for placing the button blanks in the carrier; Fig. 4 is an enlarged vertical sectional view taken on the line $4^x$—$4^x$ of Fig. 3; Fig. 5 is a horizontal sectional view taken on the line $5^x$—$5^x$ of Fig. 3; Figs. 6 and 7 are similar views taken on the lines $6^x$—$6^x$ and $7^x$—$7^x$ of Fig. 3; Fig. 8 is a transverse sectional view of the button carrier showing its driving mechanism taken on the line $8^x$—$8^x$ of Fig. 2; Fig. 9 is a detail view of the main driving mechanism of the machine; Fig. 10 is an enlarged detail view of the right hand side of the machine, as shown in Figs. 1 and 2; Fig. 11 is an enlarged plan view of the take-off or transporting mechanism; Fig. 12 is a vertical sectional view on the line $12^x$—$12^x$ of Fig. 11; Fig. 13 is an enlarged detail view taken on the line $13^x$—$13^x$ of Fig. 12; Fig. 14 is a similar view taken on the line $14^x$—$14^x$ of Fig. 12; Fig. 15 is a detail sectional view showing the transferring of the button from the carrier to the transporting devices; Fig. 16 is a sectional view taken on the line $16^x$—$16^x$ of Fig. 11, showing the button in transit from the carrier to the conveyer; Fig. 17 is a detail view showing the button deposited on the conveyer; Fig. 18 is a plan view of a stencil frame showing an arrangement of three stencil charts thereon; Fig. 19 is a longitudinal sectional view on the line $19^x$—$19^x$ of Fig. 18; Fig. 20 is a detail view of the stencil cleaning brush; Fig. 21 is a detail side elevation showing the arrangement of the spraying nozzles above the buttons and stencils; Fig. 22 is a detail sectional view of the spraying nozzle taken on the line $22^x$—$22^x$ of Fig. 21; Fig. $22^a$ is a detail face view of the air outlet orifices of the spray head taken on the line $22^a$—$22^a$ of Fig. 22; Fig. 23 is a top plan view showing the means of mounting the spraying nozzles; Fig. 24 is a side elevation showing the cluster of air blast nozzles used for drying the parts; Fig. 25 is a detail view showing the pivotal support of said nozzles; and Fig. 26 is a detail sectional view showing the arrangement of the conveyer belts.

Similar reference numerals throughout the several figures indicate the same parts.

A stenciling machine constructed in accordance with my invention comprises generally a revoluble disk or carrier provided on its periphery with pockets or slots for the button blanks, and supporting above the latter the stencil supporting frames, which advance and retract relatively to the button pockets during the rotary movement of the carrier. The latter is mounted on an inclined axis and is inclosed within a drum or pan-shaped frame containing the fluid or chemical solution employed for cleaning the stencils and those parts of the mechanism which would otherwise become clogged with the stenciling material. The arrangement of the axis of the carrier in the manner described permits its lower edge to continually pass into and emerge from a bath, while its upper edge is always above the level of the bath, at which point the stenciling solutions are sprayed over the parts, and received on the underlying buttons.

Buttons are introduced into the pockets of the carrier by devices for transferring them from a point to which they are delivered by the sorting mechanism, which picks out individual buttons from large quantities contained in the hopper. These transferring devices are designed to pick up the buttons on fingers, or projections, coöperating with the apertures or eyes of the buttons, and successively deposit them in the pockets on the carrier.

After the stenciling operations the buttons are taken off or removed from the carrier by the transporting devices and subsequently deposited onto a slowly traveling belt or conveyer, the transporting devices being timed relatively to the movement of the button carrier and the conveyer, and also comprising an arrangement of parts whereby the buttons are distributed across the face of a comparatively wide belt, this scheme permitting a large number of buttons to be accommodated on a short, slowly traveling belt, and ample time provided whereby the stenciling solution may become thoroughly dried before the buttons are allowed to come in contact with one another.

In the machine which I have illustrated as showing one embodiment of my invention, the main frame comprises the pedestal 1, carrying the inclined pan having the bottom 2 and the surrounding wall 3, forming a receptacle adapted to contain fluid which may be introduced through a pipe 4 and its level maintained at the desired elevation by the overflow pipe 5. At the center of the pan is an upwardly extending sleeve 6, in which is journaled a shaft 7 attached to the disk 8 which carries the button pockets or seats and the stencil frames. This arrangement of the parts is shown more in detail in Figs. 2, 8, 18 and 19, to which reference will now be made. The disk 8 is provided about its periphery with a series of button pockets or seats 9 which are spaced equidistantly. On the face of the disk in radial alinement with each pocket is a slot 10 and above the slot is a pair of ways in which is guided the stencil frames 15, carrying in the present instance the three stencil charts A, B and C, preferably formed by cutting the desired patterns in a thin metal sheet, clamped on the underside of the frame 15, and exposed through the aperture therein, as shown in Figs. 18 and 19. In the operation of the machine the frames 15 are first retracted into a position to expose their respective button pockets and are then advanced successively to position the first, second and third charts over the button, where they dwell momentarily while the stenciling solution is being sprayed from the nozzles A', B', Fig. 21. The radial reciprocatory movement of the frames 15 on the disk 8 is accomplished by means of a cam track 16 in an underlying circular frame 17 supported on the sleeve 6, said cam track receiving the studs 18 on the frames 15, which project through the slots 10, and on their lower ends carry anti-friction rollers 19.

The outline of the cam track 16 is shown in Fig. 2. At the point marked $16^a$ the stencil chart frames are retracted or moved inwardly on the carrier so as to uncover or expose the underlying button pocket to facilitate the insertion of the buttons therein. This is termed the receiving position. Beyond this point the cam track curves outwardly in a wave line forming the successive steps $16^b$, $16^c$ and $16^d$, which are concentric with the center of movement of the carrier disk 8. This particular arrangement of the cam is provided in order that the chart frames will be alternately and intermittently projected to successively position the charts A, B and C of each over the button pockets, and upon each movement be allowed to dwell for a brief period during the application of the spray. Beyond the point $16^d$ the cam is curved to retract the chart frames at the point $16^e$ again uncovering the button pockets to permit the removal of the buttons by the transporting mechanism. The lower portion of the carrier disk 8, and approximately one-half of the disk, is constantly submerged in the bath of cleaning solution, and during the passage of the stenciling charts through the bath they are reciprocated for the purpose of thoroughly subjecting every part to the action of the fluid. The movement of the charts through the bath by the rotation of the carrier or disk, in addition to their reciprocation thereon supplies a means of agitating the charts in the fluid so that they may be thoroughly cleansed of the stenciling pigment. At one point in the travel of the chart frames, preferably at the time when they reach their lowest point, they are held in projected position by a portion 16ᶠ of the cam track to permit them to be subjected to the somewhat forceful action of streams of cleaning fluid issuing from small orifices or jets in the nozzles 20 and 20ᵃ extending laterally from the pipe 4 and arranged on opposite sides of the plane of the disk or carrier 8. The cleaning fluid, it will be understood, is introduced into the pipe 4 by a suitable form of pump 4ᵃ, which, together with the overflow pipe 5, communicates with a suitable reservoir 5ᵃ. The last step in the movement of the stencil frames 15 occurs after the latter are carried out of the bath, then they are reciprocated by the portion 16ᵍ of the cam track, during which time they are thoroughly dried by blasts of air applied to their upper and lower surfaces by means of a plurality of nozzles arranged as shown in Figs. 21, 24 and 25, said nozzles being oscillated, as will be more fully described hereinafter.

Rotary movement is imparted to the disk 8 by means of suitable driving mechanism, which produces an intermittent step by step movement. The particular mechanism which I have employed for driving the disk or carrier is illustrated in detail in Figs. 8 and 9, and comprises the large gear wheel 22 attached to the shaft 7, beneath the bottom 2 of the pan or outside frame. At one side of the latter is the driving pinion 23 journaled on a stud 24, to which motion is imparted by the worm 25 (Fig. 9) coöperating with spherical roller projections 26 on the hub of the pinion 23. The thread of the worm 25 is not a true spiral, but comprises parts of different pitch for varying the speed of travel of the disk or carrier 8. One portion of the thread causes the disk to move slowly at the time buttons are being inserted in and removed from the pockets at different points in its circumference and while the stenciling material is being applied to the stencils. The other portion of the thread imparts an accelerated movement to the disk to bring new or successive pockets into the positions just referred to. The worm 25 is rotated by the pair of gears 27, one of which is attached to a short shaft carrying tight and loose drive pulleys 28.

The spraying apparatus is located at the high side of the machine and may comprise one or more spray nozzles such as A' and B', as shown in Fig. 21. These are preferably adjustably mounted on a cross piece 30, having the upturned slotted ends 31 which receive the clamping bolts 32 by means of which said bar is capable of vertical and angular adjustment on its supports 33. Each of the spray nozzles is carried on a horizontal arm 34 projecting laterally from the screw 35, which by means of the nuts 36 may be moved upwardly or downwardly to position the nozzle at the desired elevation relatively to the edge of the disk or carrier 8 and the stenciling charts thereon.

Each spray nozzle is provided with a valve stem 37, the outer end of which is attenuated to form a cleaning pin which projects through the tip of the nozzle when the latter is closed to prevent it becoming clogged by foreign substances or sediment or accumulations which may tend to gather on or about the outlet orifice as the result of the gummy nature of some of the stenciling solutions. The valve stems of the several nozzles are operated periodically by trip levers, indicated by A², B² and C², (Figs. 10 and 21) pivoted upon outwardly extending brackets 38 on the adjusting screws 35. In their normal position the pins 37 are retracted, the orifices in their respective nozzles remaining open, the operating levers of each of said pins being operated in one direction by contractile springs 39 (Fig. 21). The pins, however, are retracted and normally held in this position, but the valves are closed momentarily by trip levers A³, B³, C³ on a rock shaft 40 (Fig. 10) connected by a lever 41 and a link 42 to another lever 43, which is one of three levers pivoted on a stud 44 underneath the frame in proximity to the worm 25, and each of which coöperates with a cam 45 rotating with the driving worm 25. The member 45 is in effect three different cams, since two of the levers coöperate with the edges of its outer face while the third engages the cam slot in one of its side faces. The lever 43 is provided with a roller 46 which drops into the notch or depression 46ᵃ on the periphery of the cam once for each complete revolution thereof, which permits the spray nozzles to be closed momentarily and their tips cleaned out.

In order that a clear and well defined imprint of the stencil pattern may be obtained, I provide means for moving the button blanks into proximity with the chart during the spraying operation, so that a relatively close contact is obtained between the face of the button and the lower side of the chart. To this end I make each of the button pockets 9 capable of vertical movement, or movable in a direction transverse to the plane of their support, the disk 8. The detail of this construction is shown in Fig. 19, where the button pocket 9 is illustrated in the form of an annular ring having the button seat 9ᵃ in its upper face. This ring is also fitted in an annulus 47, said parts being so formed as to provide them with opposing shoulders at opposite sides of a recess in which may be arranged a coil spring 48 normally serving to depress the pocket and hold it in its lowermost position, the downward movement thereof being limited by the laterally projecting ends of pins or fingers 49 fitting in small slots in the outer wall of the ring 9. These ring pockets are elevated periodically to position the face of the button close to the chart by means of fingers $A^4$, $B^4$, $C^4$ on a rock shaft 50 journaled between the frame pieces or standards 33. The shaft 50 is oscillated by a depending lever 51 connected by the rod 52 with the lever 53 pivoted on the stud 44 carrying the roller 54 riding on the periphery of the cam 45, and once in each revolution thereof dropping into the recess $54^a$, permitting the spring 55 to move the lever 51 so that the three button pockets engaged by the levers $A^4$, $B^4$ and $C^4$ will be held elevated during the time the corresponding charts are held stationary on the disk 8 by reason of the concentric portions $16^b$, $16^c$ and $16^d$ of the cam slot.

The air blast nozzles for facilitating the drying of the stenciling charts and button pockets, as they emerge from the bath, comprise a series of nozzles 60, some arranged above and others below the plane of the disk 8, and all supplied with compressed air conveyed through the pipe 61. These nozzles are adapted to oscillate so that the air current may be distributed over a wide area, and to this end some of them are mounted on a head 62 (Fig. 25) journaled on a stud 63 on an arm 64 projecting inwardly from the wall 3 of the pan. At one side of the head is a pair of lugs to which is attached, by a pin 65, a rod 66 connected to a lever 67, pivoted at 68 and attached to its lower end by the link 69 to the lever 70. The latter, it will be noticed, is provided with the roller 71 which travels in the cam slot $71^a$ of the cam 45. The outline of this slot may be varied, but it is preferably of such a shape that the air blast nozzles will be oscillated inwardly and outwardly during each retarded step of the disk or carrier 8.

In a machine of this character the construction of the spraying nozzle is important, and in Figs. 21, 22 and 23, I have shown an arrangement of parts forming part of my present invention, which constitute a nozzle particularly adapted for use in an automatic stenciling machine of the character described. The nozzle comprises a cross shape casting having the laterally extending tubular arms 75 and 76 the former being connected by a pipe with a receptacle not shown, containing the dye or stenciling solution, while the other arm is connected to the chamber of an air compressor. The downwardly extending arm of the casting, indicated by 77, is provided with the central liquid passage $75^a$ and the air passage $76^a$, which latter terminates in an annular channel surrounding the liquid passage, as shown in Fig. $22^a$, and from which the air issues in a practically continuous tubular air sheet. Screwed into the lower end of the passage $75^a$ is the atomizing tip 78 within which is the valve seat $78^a$, which is normally opened by the conical shaped portion of the valve pin 37, the reduced end of which is smaller than the bore of the nozzle and projects into the latter. The exterior cap or atomizing tip, indicated by 79, is supported on the arm 77, and its lower conical end is of such shape and length that a narrow space surrounds the extremity of the fluid nozzle 78.

The spraying nozzle is supported in a frame formed of two arched members 80 on the end of the arm 34, said side pieces being connected at their lower ends where they are united by suitable fastening devices 81 with the sides of the cross casting. This arrangement of the parts permits the nozzle to be held in such a position that the pipe connections may be conveniently made between the ends of the arms 75 and 76, and a free space also provided for the operation of the lever $A^2$ coöperating with the combined valve and cleaning rods 37. The latter, it will be noticed, has an adjustable connection with the operating lever $A^2$ by means of the screw threaded nuts 83. The valve rod is also moved in the direction to close its conical end against the valve seat $78^a$ by means of a coil spring 84 operating against a shoulder on the rod and the inner side of the top of the cap which incloses it.

The transferring devices for carrying the buttons from the point at which they are deposited and placing them on the seats $9^a$ of the button pockets are illustrated in detail in Figs. 3 to 6. The buttons are placed *en masse* in a hopper 85 having an inclined bottom, as shown, provided with suitable assorting devices by means of which single buttons may be selected and deposited in a tubular chute 86 through which they will descend and finally be delivered at the end of the chute as shown in Fig. 4. The chute is so shaped that each button will come to a position of rest with its outer face uppermost, and the extremity of the chute overlies a circular lip 87 on a rotary head 88, and provided with a plurality of recesses $87^a$, $87^b$, $87^c$ and $87^d$, forming button holders, which during the rotation of the head pass successively beneath the end of the chute. The delivery of buttons into the chute by the assorting devices of the hopper is so timed relatively to the rotation of the head 88 that they are only deposited singly into the apertures $87^a$, $87^b$, $87^c$ and $87^d$. The head 88 is journaled on a sleeve 89 in the form of a stationary standard on which is a segment shaped rim or button supporting platform 90, which underlies the apertured lip or flange 87 and is cut away at one side to accommodate the edge of the disk or carrier 8 and permit the latter during its step by step movement to place its pockets successively beneath the apertures 87ª, 87ᵇ, 87ᶜ and 87ᵈ, as shown in Figs. 4 and 5, said parts being timed in their rotary movement so that the successive pockets on the carrier 8 register with said button apertures in the disk 87.

The head 88 is provided with perforated bosses 87ᵉ, 87ᶠ, 87ᵍ and 87ʰ in alinement with which, and at the upper end of the head, are ears 91, said bosses and ears forming bearings for rotating the vertically movable button pickers 88ª, 88ᵇ, 88ᶜ and 88ᵈ. The several button pickers are similarly constructed, and a description of one of these in detail will answer for all.

The picking devices of the transferring mechanism comprise tubular shafts as indicated by 88ª and 88ᵈ in Fig. 4, which are slotted transversely at their lower ends, and provided with fingers 92 pivoted at 93, and having at their lower ends pins 94 of a size suitable to engage in the eyes of the buttons. Coöperating with the upper ends of the fingers 92, for the purpose of moving them to adjust the pins 94 according to the spacing of the eyes of different buttons, is a screw threaded rod 95 which is adjustable longitudinally in the tubular shaft, and is provided with a conical point by means of which the distance between the upper ends of the fingers 92 may be regulated. Coöperating with the outer edges of these fingers is a collar 92ª having the inwardly beveled lower edge and operated in one direction by the yielding spring 92ᵇ, whereby the pins 94, which are slightly beveled as shown in Fig. 4, may be held separated in such a position that they will frictionally engage with the sides of the eyes of the button, and serve to transport the latter.

A stripper surrounds the lower end of the pickers in the form of a sleeve 96 provided midway of its length with offset shoulders 96ª, one of which forms a bearing for one end of the spring 92ᵇ, while the other forms a similar bearing for the somewhat stronger spring 96ᵇ, the upper end of which bears against the top of the boss in which these parts are inclosed, and serves to project the lower end of the sleeve beyond the ends of the fingers 92 for the purpose of stripping the buttons from the pins 94 and locating it on the button seat 9ª. The upper end of the sleeve 96 is provided with a collar 96ᶜ having a laterally projecting finger 96ᵈ, extending through a slot 96ᵉ in the head 88 and provided at its end with an antifriction roller 96ᶠ, which, as the head 88 rotates, coöperates with the cam surface 97, and causes the stripper sleeve 96 to be held in inoperative position as shown at the right hand side of Fig. 4, or released and moved into the stripping position as shown at the left hand side of said figure. The picker shafts are also elevated to carry their lower extremities over the end of the button chute 86, and to this end each of said shafts is provided with an adjustable collar 98 with which the upper end of the sleeve 96 coöperates, the shape of the cam surface 97 being such that during the rotary movement of the head 88 each picker shaft will be allowed to descend into engagement with the underlying button as soon as this is carried from beneath the chute 86. The picker shafts are rotated continuously in order that the pins 94 may be caused to engage the eyes of the buttons, and the handling of the latter in this way is preferred as it not only lessens the liability of injury to the surface of the button, but also insures the positioning of the button on the pockets of the machine in such a way that the stencil patterns will be applied to each button in precisely the same position. The rotary movement is obtained by providing each of the shafts 88ª, 88ᵇ, 88ᶜ and 88ᵈ with the pinions 89ª, 89ᵇ, 89ᶜ and 89ᵈ, which are keyed to their respective shafts between the pairs of ears 91, and mesh with the teeth of the stationary gear 99. The gear 99 and the cam surface 97 are preferably formed at the upper and lower ends of the collar 100 rigidly attached to the sleeve 89. The head 88 journaled on the sleeve 89 is rotated by the shaft 101, which is journaled in the sleeve, and is connected to the head by the face plate 88ʲ and key 88ᵏ. On the lower end of the shaft 101 is a gear wheel 101ª driven by the gear wheel 22. The shaft 101 is also utilized to drive the selecting mechanism in the hopper 85, to which motion is imparted by a pair of bevel gears 101ᵇ.

The button transferring devices just described, it will be noticed in Fig. 2, occupy a position at one side of the axis of the disk or carrier 8 so that the buttons will be inserted in the pockets 9 when the stencil frames 15 are retracted by the portion 16ª of the cam which operates them. Occupying a similar position at the opposite side of the axis of the carrier is the take-off, or transporting mechanism, which operates to remove the buttons successively from the various pockets when the stencil frames are retracted by the portion 16ᵉ of the stationary cam track. The detailed arrangement of the transporting mechanism is shown in Figs. 11 to 17 inclusive.

The transporting devices comprise a disk 105 provided with a plurality of peripheral apertures 105ª, revolving upon an axis formed by the shaft 106, extending downwardly at a slight angle to a vertical line parallel to the shaft 7, and journaled in the part of the frame indicated by 106ª, part of which extends laterally, as indicated by 107, Fig. 12, and serves to support other portions of the mechanism coöperating with the disk 105. The latter overlaps the edge of the disk 8 sufficiently so that its various apertures 105ª will be caused to register with the button pockets 9, and these parts are driven in unison by the gear wheel 106ᵇ, on the shaft 106, meshing with the gear wheel 22, on shaft 7. Underlying the rim of the disk 105 is a stationary ring sector 108, mounted on the portion 107 of the frame, and projecting therefrom at one side between the overlapping edges of the disks 8 and 105, as shown in Fig. 13. This plate is provided with an aperture 108ª at the point of intersection of the line of travel of the button pockets 9 and the apertures 105ª, and terminating in a shoulder 108ᵇ which is arranged approximately in alinement with the forward edge of the pockets 9 at the point where in their movement they are in exact register with the apertures 105ª. The plate 108 is comparatively thin and the shoulder 108ᵇ thereon forms an abutment or edge over which the button slides as it is carried forwardly by the conjoint action of the button grippers, or centering devices, and the elevating members which raise said buttons out of their pockets. This action is accomplished by means of a plurality of projections or heads 109 on the stud shaft 110 revolving in timed relation to the disk 8 so that the heads move into and out of the successive pockets 9. The shaft 110 is mounted in the bearings 110ª and rotated by a pair of gears 111, one of which may be integral with the gear wheel 106ᵇ as shown in Fig. 12. The heads 109 fit within the button pockets 9 and are adapted to raise the buttons off of their seats 9ª into the position shown in Figs. 13 and 15, so that each button in its onward movement will be transferred onto the stationary plate 108, and will slide along the latter until it reaches the point where it is discharged therefrom.

The button holders or centering devices, comprise narrow arms undercut at their lower edges and having downwardly extending projections 112 at their extremities, which are adapted to extend over and engage the periphery of the buttons without contacting with any material portion of the faces of the buttons. These grippers are carried upon spring arms 113, the outer ends of which traverse a semicircular cam track 114, a portion of which, indicated at 114ª, is of such a height that it will hold the grippers in inoperative position, as shown in Fig. 15, and will release them so that they may pass into the position shown in Fig. 16 in engagement with the button when the latter is elevated off of its seat by one of the studs 109, and at about the time the buttons slide onto the plate 108, as shown in Fig. 13. The button being thus held is carried along on the slide-way or plate 108 until the end of the latter is reached at the point indicated by 108ᶜ, when it passes onto the distributer which causes successive buttons to be dropped onto the conveyer belt 115 in various positions across said belt, as indicated in Fig. 11, by the dotted circular lines 116.

The distributer is in the form of a ring 117 journaled eccentrically of the take-off disk 105 on a shoulder 118 on a part 107 of the frame. The distributer lies close to the underside of the disk 105 and is rotated in timed relation thereto by the gear wheel 119 on the shaft 106 meshing with the pinion 120, which coöperates with the internally toothed gear ring 117ª on the ring 117. At opposite sides of the ring 117 are slots 117ᵇ and 117ᶜ which uncover the apertures 105ª as they pass beneath them. The ring 117 rotates in a direction opposite to the movement of the disk 105, and also at a considerably faster rate of travel, the timing, however, of these parts being such that the buttons will be dropped from successive pockets onto the conveyer in spaced relation, no two buttons being in contact.

Overlying the spring fingers 113 carrying the grippers are similar snapper springs 125, which are offset as shown in Fig. 11, and provided with downwardly extending pins 125ª (Fig. 17) having a lower inclined end acting as cam surfaces by which these springs are elevated by engagement with the sides of the notches 117ᵇ and 117ᶜ, said notches being also provided with lateral extensions, or otherwise made of sufficient width to release the pins and permit the springs 125 to rap the button holder and prevent the button from adhering to the grippers should the stenciling solution be of a sticky or gummy nature and tend to adhere to the narrow edges of the grippers when in a moist condition.

The conveyer onto which the stenciled buttons are deposited for the purpose of drying, is a traveling surface in the form of a belt as before mentioned, and indicated by 115, which may be of any desired length, but preferably of such an extent that the stenciling solution applied to buttons will become thoroughly dried before they reach the end of the travel of the conveyer, after which they may be deposited directly into a box or receptacle, as will be understood. In the drawings the belt 115 is shown as passing around a broad faced pulley 130 (Figs. 12 and 14) rotated by a worm gear wheel 130ª driven by a worm 130ᵇ on a shaft carried in a bearing 130ᶜ having at its lower end a pinion 130ᵈ meshing with the gear wheel 106ᵇ. In order to bring the edges of the conveyer into proximity with the under face of the ring 117 I overlay the belt 115 with two narrow belts 115ª and 115ᵇ at its edges, which rest upon said belt throughout its length with the exception of that portion surrounding the pulley 130. At this end of the conveyer the belts 115ᵃ and 115ᵇ are supported on smaller rollers 131, as shown in detail in Fig. 26.

In the operation of applying the stenciling material I prefer to do this by atomizing nozzles and to carry on the spraying operation in a practically continuous manner, only discontinuing it at sufficiently frequent intervals to permit the nozzles to be cleared out. In practice this is accomplished very quickly by the dropping of the valve stems or cleaning-out pins 37, which occurs when the roller 46 passes into the depression 46ᵃ in the cam 45. This operation is timed to occur during the interval when the stencil chart frames 15 are being moved outwardly by the inclined portions of the cam. The several spray nozzles arranged on the crossbar 30 are so adjusted that the stenciling fluid ejected from each will cover an area or zone somewhat larger than the separate stencils A, B and C. The separate spray heads are positioned above the path described by the button pockets, so that the areas covered by the stenciling fluid discharged therefrom do not embrace or cover the stencils until they have been moved outwardly and fully cover the underlying buttons where they are for the time being held stationary in these positions.

To facilitate the cleaning of the stencils of any superfluous fluid thereon, a rotary brush may be arranged to coöperate with the stencils before they enter the cleaning solution, as shown in Figs. 1, 2 and 20.

A button stenciling machine of the character here shown and described is adapted to operate continuously and handle large quantities of buttons. Various sizes of buttons may be treated, it being only necessary to change the seats or pockets on the carriers as occasion may require. The thin sheets of metal, or other material, from which the stencils are cut, are removably mounted on the frame pieces, and those required for producing different and varied patterns may be readily applied or removed.

I claim as my invention:

1. In a button stenciling machine, the combination with a movable carrier provided with button pockets and stencils movable on the carrier during its movement, of devices for feeding buttons into said pockets successively and other devices for subsequently removing the buttons from the pockets.

2. In a button stenciling machine, the combination with a movable carrier having button seats thereon and stencils mounted on the carrier, of means for moving said stencils to cover and uncover buttons on the seats and feeding devices coöperating with the carrier to successively position buttons on said seats.

3. In a button stenciling machine, the combination with a continuously traveling carrier provided with button seats, of stencils guided on said carrier, and means for reciprocating them during the movement of the carrier to cover and uncover buttons arranged on said seats.

4. In a button stenciling machine, the combination with a movable carrier provided with button seats, and stencil chart frames guided on the carrier, of stencil charts carried by the frames, means for reciprocating said frames during movement of the carrier and means for applying a stenciling substance to the charts.

5. In a button stenciling machine, the combination with a movable carrier and button seats arranged in spaced relation thereon, of movable stencils on the carrier arranged one for each button seat, and means for adjusting said stencils into positions on the carrier to successively cover and uncover the button seats.

6. In a button stenciling machine, the combination with a continuously movable carrier, a plurality of stencils thereon and a button seat beneath each stencil, a cam track controlling the movement of said stencils to successively cover and uncover their respective button seats during the movement of the carrier.

7. In a button stenciling machine, the combination with a carrier adapted to be moved continuously provided with button seats, of a plurality of stencils on said carrier adapted to be successively positioned over each button seat and means for operating them into positions above their respective button seats at different points in the movement of said carrier.

8. In a button stenciling machine, the combination with a carrier provided with button seats and means for moving it continuously in one direction, of a plurality of stencils on said carrier arranged one behind the other and adapted to be positioned successively over their respective seats, of means for advancing said stencils at different points in the movement of the carrier, said means also acting to retract the charts to uncover the button seats.

9. In a button stenciling machine, the combination with a carrier provided with button seats, a plurality of stencils arranged in sets, one set for each seat, of a cam track coöperating with said sets of stencils and arranged to successively project each set of stencils relatively to its respective seat.

10. In a button stenciling machine, the combination with a carrier provided with button seats, a plurality of sets of stencils, one set for each seat, each of said sets comprising a plurality of separate stencil charts, of a cam track coöperating with said sets of stencils and arranged to successively project them relatively to their respective seats, said cam track being adapted to advance the sets of stencils and to permit each of the separate stencil charts to dwell above its seat during the travel of the carrier through a given distance, and means for applying different stenciling substances during the different periods of dwell of the different stenciling charts.

11. In a button stenciling machine, the combination with a plurality of button pockets arranged successively, of a plurality of sets of stencils each comprising a plurality of stencil charts and arranged one set for each pocket, of means for reciprocating each set of stencils relatively to its respective pocket, said means being adapted to permit each separate stencil chart to assume a position of rest over its respective pocket during a portion of the movement of the latter, and devices for applying a stenciling substance to the charts during each period of rest.

12. In a button stenciling machine, the combination with a plurality of pockets arranged in spaced relation, frames reciprocating over said pockets, and a plurality of stencils carried on each frame, of means for advancing each frame by a step by step movement to successively position the stencils thereon over their underlying button pocket, said means acting at two points in the travel of a pocket to cause said frames to be moved to a position to uncover them, means for inserting buttons in the pockets in one of said positions and mechanism for removing the buttons from the pockets when the latter reach the second position.

13. In a button stenciling machine, the combination with a rotatable disk having button pockets arranged on its periphery, stencils carried on the disk and means operating during the rotary movement of the disk to adjust the stencils successively from positions away from the pockets to positions over the same.

14. In a button stenciling machine, the combination with a rotatable disk provided with peripheral button pockets, of stencils arranged above the pockets and guided to move in radial lines on the disk, means coöperating with said stencils during the rotation of the disk for reciprocating them.

15. In a button stenciling machine, the combination with a continuously rotating disk, button seats on its upper surface and radially extending guides arranged relatively to each seat, of stencils carried on the guides and means coöperating with said stencils to cause them to move relatively to their respective button seats upon the rotary movement of the disk.

16. In a button stenciling machine, the combination with a circular carrier, button seats thereon, and stencils guided on the carrier, of means for driving the carrier, a stationary cam track arranged relatively to the latter and coöperating with said stencils to cause each of them to reciprocate relatively toward and from their respective seats during the movement of the carrier.

17. In a button stenciling machine, the combination with a circular carrier having button seats thereon and provided with apertures, of a cam track beneath the carrier, and stencils arranged on the latter movable relatively to the button seats and having portions projecting through the apertures in the carrier and engaging the cam track.

18. In a button stenciling machine, the combination with a circular carrier provided with button seats and having slots arranged relatively to said seats and provided with guides adjacent the slots, of stencils carried in the guides and provided with projections extending through the slots and a cam track underlying the carrier coöperating with said projections, said cam track being shaped to effect a reciprocatory action of the stencils on the carrier during its rotary movement.

19. In a button stenciling machine, the combination with a continuously movable carrier having button seats and provided with guides at one side of said seats, of frames sliding in the guides, a plurality of stencils carried on each frame and means for projecting the frames to successively position different ones of their respective stencils over the button seats.

20. In a button stenciling machine, the combination with a carrier provided with a plurality of button pockets, frame pieces guided on the carrier at one side of each of said pockets and means for moving the carrier continuously in one direction, of a plurality of stencils arranged on each frame, and means acting during the movement of the carrier for successively projecting said frames by a step by step movement which positions the stencils successively above the button pockets and permits them to temporarily dwell in such positions.

21. In a button stenciling machine, the combination with a carrier provided with button seats, a plurality of frame pieces spaced peripherally on the carrier and stencils mounted on the frame pieces, of a plurality of spraying apparatuses for applying stenciling solutions, of means for adjusting said frames to position their different stencils successively over the button seats, means for moving the carrier continuously in one direction and means for intermittently operating the spraying devices.

22. In a button stenciling machine, the combination with a continuously moving carrier having button seats, of a plurality of frames each having a set of stencils comprising a plurality of separate stencil charts and adapted to coöperate with a respective button seat, means for operating said frames to successively position their separate charts over their respective button seats at given points in the path of movement of the carrier, and mechanism for applying stenciling substances to the different charts when in operative positions.

23. In a button stenciling machine, the combination with a carrier provided with a plurality of button seats, a frame for each seat having a set of stencils comprising two or more stencil charts, means for operating said frames intermittently to position the separate stencils over the button seats and means for driving the carrier, of a plurality of mechanisms for applying stenciling material to the stencils and means for operating said mechanisms.

24. In a button stenciling machine, the combination with a carrier having button seats, of a plurality of separate mechanisms for applying stenciling substances and a plurality of sets of stencils for each seat, each of said sets comprising a plurality of stencils, of means for bodily operating each set intermittently to successively position one of its respective stencils over its button seat and beneath said applying mechanisms, and means for operating each of said applying mechanisms periodically to apply a stenciling material from each to a particular stencil.

25. In a button stenciling machine, the combination with a carrier for buttons, a set of stencils on the carrier comprising a plurality of stencil charts and means for operating the set bodily to successively position each of said charts over its respective button on the carrier, of a plurality of devices for spraying different stenciling fluids onto the different stencil charts and means for advancing the carrier and intermittently operating the different spraying mechanisms.

26. In a button stenciling machine, the combination with a button carrier and a plurality of sets of stencils thereon, each comprising two or more stencil charts, of means for moving the carrier and bodily moving the different sets of stencils to successively position the different stencil charts of each set over buttons on the carrier, of a plurality of mechanisms for applying stenciling material, arranged above the path of travel of the carrier and stencil charts, and means for operating the stenciling applying mechanisms in timed relation to the movements of the carrier and stencil charts.

27. In a button spraying machine, the combination with a carrier adapted to receive buttons in spaced relation thereon, a plurality of sets of stencils thereon, each set comprising two or more separate stencil charts and means for continuously advancing the button carrier and successively adjusting each set of stencils bodily to position its respective stencil charts over its respective underlying button on the carrier at different points in the movement of the latter, of separate spraying nozzles, for applying different stenciling materials, comprising normally open valves and means for closing each of said valves periodically.

28. In a button stenciling machine, the combination with a movable carrier, devices for placing buttons thereon and other devices for subsequently removing said buttons from the carrier, of a plurality of movable stencils adapted to be operated to coöperate with buttons placed on the carrier during the period of movement of the carrier between said applying and removing devices, of mechanism for applying stenciling material arranged between the button applying and removing devices and coöperating with the successive stencils.

29. In a button stenciling machine, the combination with a movable carrier, devices for placing buttons thereon and other devices for removing said buttons therefrom and a plurality of stencils coöperating successively with buttons applied to said carrier, of means for moving the latter at a slow speed during the time the buttons are applied thereto and removed therefrom and for accelerating the movement of the carrier between said points, mechanism for applying stenciling material to the stencils which is normally inoperative, and means for operating it to apply such material to the stencils during the retarded action of the carrier.

30. In a button stenciling machine, the combination with a movable carrier, devices for applying buttons thereto, other devices for removing buttons therefrom, a spraying apparatus arranged between the feeding and removing devices, of a plurality of stencils mounted on the carrier and adapted to coöperate successively with the buttons placed thereon, means for driving the carrier, feeding and removing devices at alternately slow and accelerated rates of speed, and relatively timed mechanism for operating the spraying apparatus during the slower movement of said parts.

31. In a button stenciling machine, the combination with a receptacle adapted to contain a liquid bath, a continuously movable carrier passing into the bath at one point and emerging therefrom at another and adapted to receive buttons, of stencils mounted on the carrier and adapted to coöperate with buttons placed thereon and movable with the carrier through the bath.

32. In a button stenciling machine, the combination with a carrier adapted to receive buttons and movable stencils thereon, of a liquid cleaning bath in which a portion of the carrier is submerged, and means for agitating the stencils during their passage through the bath.

33. In a button stenciling machine, the combination with a carrier adapted to receive buttons, a plurality of stencils mounted thereon adapted to coöperate with buttons placed on the carrier and a liquid bath in which a portion of the carrier is submerged, of a source of liquid supply for the bath comprising a discharge nozzle directing fluid under pressure against the stencils during their passage through the bath.

34. In a button stenciling machine, the combination with an endless carrier adapted to receive buttons and stencils mounted thereon, of a bath in which a portion of the carrier and stencils are constantly submerged, means for circulating the liquid in the bath, comprising an inlet nozzle having orifices arranged to discharge the bath fluid in contact with the stencils and submerged portion of the carrier.

35. In a button stenciling machine, the combination with a continuously movable endless carrier adapted to receive buttons and a plurality of stencils mounted thereon adapted to coöperate with each button, of a bath of liquid cleaning solution immersing a portion of the carrier and the stencils, an auxiliary reservoir and a circulating system for the bath, comprising an overflow and an inlet pipe leading from the reservoir and terminating in a nozzle provided with a plurality of orifices for discharging said liquid into direct contact with the carrier and stencils.

36. In a button stenciling machine, the combination with a circular button carrier rotating in an inclined plane and adapted to receive buttons about its periphery, a plurality of stencils mounted on the carrier, and a liquid bath surrounding the lower edge portion of the latter and means for continuously rotating said carrier.

37. In a button stenciling machine, the combination with a disk mounted to rotate in an inclined plane and adapted to receive buttons along its upper edge, of a succession of stencils mounted on the disk at equidistant points about its circumference, of a liquid bath surrounding the lower portion of the disk and the stencils thereon, driving devices for rotating the disk continuously and means for agitating the stencils during their passage through the bath.

38. In a button stenciling machine, the combination with a circular carrier rotating in an inclined plane and adapted to receive buttons along its upper edge and having stencils mounted for radial reciprocatory movement, of a liquid bath surrounding the lower edge portion of the carrier, a fluid discharge nozzle in the bath and means for projecting the stencils outwardly on the carrier at the point where they pass said nozzle.

39. In a button stenciling machine, the combination with a circular carrier rotating in an inclined plane and adapted to receive buttons along its upper edge and having stencils mounted for radial reciprocatory movement and arranged to extend beyond the edge of the carrier, of a nozzle adapted to discharge a cleaning fluid arranged at one side of the carrier and means for projecting the stencils outwardly thereon when they pass said nozzle.

40. In a button stenciling machine, the combination with a circular carrier rotating in an inclined plane and adapted to receive buttons along its upper edge and having stencils mounted for radial reciprocatory movement and arranged to extend beyond the edge of the carrier, of a bifurcated nozzle adapted to discharge a cleaning fluid in opposing streams, said nozzle being arranged at one side of the carrier and means for projecting the stencils outwardly between the bifurcations of the nozzle.

41. In a button stenciling machine, the combination with a continuously movable button carrier and a series of stencils mounted thereon, of a cleaning bath of heated liquid immersing a portion of said carrier and stencils, and a nozzle for directing a blast of air against the stencils and carrier after they emerge from the bath.

42. In a button stenciling machine, the combination with a continuously movable button carrier and a series of stencils mounted thereon, of a cleaning bath of heated liquid immersing a portion of said carrier and stencils, and a plurality of nozzles for directing blasts of air against the carrier and stencils as they emerge from the bath and means for oscillating said nozzles.

43. In a button stenciling machine, the combination with a continuously movable button carrier and a plurality of stencils each movably mounted thereon, of a liquid bath surrounding a portion of the carrier and the stencils thereon, of means for reciprocating the latter at the point of travel of the carrier where it emerges from the bath, and an oscillatory air blast nozzle directing a blast of air against the stencils during the reciprocatory movement.

44. In a button stenciling machine, the combination with a circular carrier revolving in an inclined plane, stencils arranged in spaced relation around the carrier and movable radially thereon, a liquid surrounding both the lower edge of the carrier and the stencils thereon and means coöperating with the stencils to first retract them, at the button receiving position, secondly to project them into stenciling position, and thirdly to retract them into discharging position during their passage around the upper side of the carrier, said means also acting to effect reciprocation of the stencils during their passage through the bath and after their emergence therefrom, of a nozzle for directing an air blast against the stencils in the last named position, devices for feeding buttons to the carrier at the point where the stencils are retracted into receiving position, and other devices for removing the buttons when the stencils are retracted into discharging position.

45. In a button stenciling machine, the combination with a circular carrier rotating about a vertically inclined axis, stencils arranged in spaced relation thereon and guided to move radially, and means for successively retracting the stencils during their ascending movement, subsequently projecting them and again retracting them during their descending movement, of devices for applying the buttons to the carrier beneath each of said stencils in the first named position, mechanism for applying stenciling substance to the stencils in the second named position, devices for removing buttons from the carrier in the third named position and a bath of cleaning solution in which the lower side of the carrier is submerged.

46. In a button stenciling machine, the combination with a continuously movable circular carrier and stencils guided for radial movement thereon, of a stationary plate arranged parallel to the carrier having a cam surface, a projection on each stencil engaging said surface for reciprocating them independently and successively during the rotary movement of the carrier and means for driving the latter.

47. In a button stenciling machine, the combination with a continuously movable circular carrier provided with slots and stencils guided for radial movement on the carrier, of a stationary plate arranged beneath the carrier having a cam slot, projections on the stencils extending through the slots in the carrier and engaging said cam slot for reciprocating the stencils independently and successively during the rotary movement of the carrier, and means for driving the latter.

48. In a button stenciling machine, the combination with a continuously movable carrier, movable button pockets thereon and stencils on the carrier adapted to register with the pockets, of means for elevating the pockets to position the buttons carried therein in proximity to the stencils.

49. In a button stenciling machine, the combination with a carrier, movable button pockets thereon and stencils movable on the carrier and adapted to be positioned over the pockets, of elevating members coöperating with the latter during the movement of the carrier to raise the buttons into proximity with the stencils when in stenciling position.

50. In a button stenciling machine, the combination with a movable carrier, a button pocket thereon movable in a plane transverse to the movement of the carrier and a stencil mounted on the latter and adapted to be projected over the pocket, of a displacing member coöperating with the pocket, when said stencil is in projected position, to move and position the button carried thereon in proximity to the stencil.

51. In a button stenciling machine, the combination with a support, a movable button seat thereon and a stencil movable into a position above the seat, of an elevating member engaging the lower side of the latter and serving to adjust the seat into a position to cause the button thereon to lie adjacent to the stencil and support it in this position during the stenciling operation.

52. In a button stenciling machine, the combination with a support, a movable circular seat adapted to receive a button and a plurality of stencils arranged to be successively positioned above said pocket at different points in the movement of the support, of separate elevating members adapted to coöperate with the pocket in each of said positions to cause the button supported thereon to be moved into proximity with the respective stencils.

53. In a button stenciling machine, the combination with a movable support having a plurality of movable button seats thereon and a set of stencils, each comprising a plurality of stencil charts adapted to be adjusted in sequence relatively to their respective pockets at different points in the movement of the support, of a plurality of elevating members coöperating simultaneously with successive button pockets to move each of them and carry their respective buttons into proximity with their respective charts.

54. In a button stenciling machine, the combination with a movable support provided with button pockets, of stencil frames arranged relatively to each pocket each provided with three stencil charts, means for successively adjusting the frames during the movement of the support to position the first, second and third charts of different frames over their respective button pockets, of three separate elevating members each coöperating with a different pocket to carry the buttons therein into proximity with said first, second and third charts, and means for operating said elevating members to release the pockets during the movement of the stencil frames.

55. In a button stenciling machine, the combination with a support, a plurality of button pockets arranged in spaced relation thereon, and a frame for each pocket carrying a plurality of stencil charts, each of said frames being adapted to be adjusted successively over its respective pocket, of a cam surface coöperating with the frames for reciprocating them during the movement of the carrier, having portions which at one point of the travel maintains alternate frames stationary in different positions of adjustment with different charts on each registering with their respective button pockets, elevating devices arranged beneath alternate pockets and means for intermittently operating said devices to hold the pockets elevated and subsequently release them in advance of the shifting movement of the stencil chart frames.

56. In a button stenciling machine, the combination with a circular carrier having movable button pockets thereon, of radially extending frames guided on the carrier, a cam surface coöperating with the frames for reciprocating them during the movement of the carrier, each of said frames having a plurality of stencil charts, and said cam surface having a plurality of concentric portions and intermediate inclined portions, the concentric portions serving to hold the different frames with their different charts in registry with their respective button pockets, and the inclined portions serving to move the intermediate chart frames into new positions, a plurality of elevating devices coöperating with the button pockets and means timed relatively to the concentric portions of said cam surface to elevate the pockets while the chart frames are at rest on the carrier and to release them before their positions are shifted by the inclined portions of said cam.

57. In a button stenciling machine, the combination with a carrier, and stencils adapted to coöperate with buttons placed on the carrier, of mechanism for driving said carrier continuously comprising a worm having a thread formed with portions of differential pitch for imparting to the carrier alternately fast and slow movements.

58. In a button stenciling machine, the combination with a movable carrier adapted to receive buttons, and stencils adapted to coöperate with buttons on the carrier, of means for imparting a continuous movement to the carrier comprising alternately fast and slow periods of travel.

59. In a button stenciling machine, the combination with a movable carrier adapted to receive buttons, of movable stencils adapted to coöperate with the buttons at different points of the movement of the carrier and mechanism for driving the latter comprising a rotary driving member movable alternately at faster and slower speeds of rotation and arranged to advance the carrier rapidly during the positioning of the stencils and to advance it with a relatively slower movement when said stencils are in stenciling position.

60. In a button stenciling machine, the combinations with a rotary carrier adapted to receive buttons, sets of stencils each comprising a plurality of stencil charts adapted to successively register with buttons placed on the carrier, and means for driving the carrier at alternating relatively fast and slow speeds, of means for shifting a plurality of the sets of stencils simultaneously during the faster movements of the carrier and holding them with one of their respective charts over buttons placed on the carrier during the slower movements thereof.

61. In a button stenciling machine, the combination with a rotary carrier adapted to receive buttons, and sets of stencils each comprising a plurality of stencil charts adapted to successively register with buttons placed on the carrier, of means for driving the carrier at alternating relatively fast and slow speeds, means for shifting a plurality of the sets of stencils simultaneously during the faster movements of the carrier and holding them with one of their respective charts over buttons placed on the carrier during its slower movements and a plurality of devices for applying stenciling material to the different charts while in their stationary positions.

62. In a button stenciling machine, the combination with a rotary carrier adapted to receive buttons, sets of stencils each comprising a plurality of stencil charts adapted to register successively with buttons placed on the carrier, of means for driving the carrier at alternating relatively fast and slow speeds, means for shifting a plurality of said sets of stencils simultaneously during the faster movements of the carrier and holding each of them during the slower movements of the carrier with one of their respective charts over buttons placed on the carrier, and a plurality of mechanisms for spraying stenciling fluid onto the charts during the time they are held stationary on the carrier.

63. In a button stenciling machine, the combination with a continuously movable carrier, means for operating it at differential speeds, devices for transferring buttons onto the carrier and other devices for transporting them therefrom, both operating to successively apply and remove buttons during the slower movements of the carrier, of stencils adapted to coöperate with buttons on the carrier and means acting to position the stencils over the buttons during the rapid movements of the carrier and hold them in such position during the slower movements thereof.

64. In a button stenciling machine, the combination with a continuously movable carrier, means for operating it at differential speeds, devices for transferring buttons onto the carrier and other devices for transporting them therefrom, both operating to successively apply and remove buttons during the slower movements of the carrier, of stencils adapted to coöperate with buttons on the carrier, means acting to position the stencils over the buttons during the rapid movements of the carrier and hold them in such position during the slower movements thereof, devices for applying stenciling material, and means for actuating said devices during the slower movements of the carrier.

65. In a button stenciling machine, the combination with a continuously movable carrier adapted to receive buttons and stencils thereon coöperating with buttons placed on the carrier, of a transporting device moving tangentially to the line of travel of the carrier having button receiving recesses and means adapted to coöperate with buttons on the carrier to transfer them to the recesses on the transporting device.

66. In a button stenciling machine, the combination with a carrier having button seats thereon, of a transporting member movable tangentially to the line of travel of the button seats provided with button receiving apertures, a stationary plate arranged between said member and the carrier and means for elevating buttons placed in the seats on the carrier into the apertures of the transporting member in position to be received on said supporting plate.

67. In a machine for handling buttons, the combination with a carrier having button seats spaced equidistantly thereon, a member having apertures adapted to register successively with said seats, and means for moving the carrier and member continuously, of means adapted to engage buttons placed in the seats to elevate them therefrom into the apertures of the transporting member and a plate arranged between the latter and the carrier having a shoulder intercepting the path of movement of the buttons when elevated.

68. In a machine for handling buttons, the combination with a continuously movable carrier having button seats thereon, a transporting member moving in unison with the carrier provided with recesses adapted to register with the button seats, of a revoluble head having a plurality of projections arranged to pass into the successive button seats and elevate buttons which have been placed thereon into the recesses in the transporting member, of a plate arranged to separate the buttons from the elevating members and to support them during the movement of the transporting member.

69. In a machine for handling buttons, the combination with a rotatable carrier provided with peripheral apertures forming button seats, a disk overlapping the face of the carrier having recesses adapted to register with said apertures, and means for continuously rotating said disk and carrier in unison, of a rotary member underlying the carrier having a plurality of heads passing successively into the various apertures of the carrier and adapted to engage and elevate the buttons seated over said apertures and means intercepting the path of movement of the buttons in this elevated position and supporting them during the further movement of the transporting disk.

70. In a machine for handling buttons, the combination with two button carrying members so arranged that the edge of one overlaps the edge of the other and both provided with recesses adapted to receive buttons, the recesses in the two members being arranged to register successively with each other, of means for raising the buttons out of engagement with the lower carrying member into the recesses of the upper member and a plate for separating the buttons from the elevating means when in a raised position and supporting them for transportation by the upper button carrying member.

71. In a machine for handling buttons, the combination with two rotatable disks arranged with their edges overlapping and both provided with recesses, those of the lower disk being adapted to receive and carry the buttons and those of the upper disk being adapted to receive successive buttons carried on the lower disk, of means coöperating with said recesses to project buttons from the recesses in the lower disk into those in the upper disk, and a guide member intercepting the path of the buttons and supporting them in the recesses of the upper disk.

72. In a button stenciling machine, the combination with a movable carrier adapted to receive buttons, stencils coöperating with buttons thereon, and means for removing buttons from the carrier comprising a rotatable plate, of an endless conveyer leading from one side of the plate and distributing devices coöperating with the latter for positioning the buttons carried by the plate across the face of the conveyer.

73. In a distributing mechanism for button stenciling machines, the combination with a movable carrier having recesses adapted to receive buttons, and a movable conveyer extending from a point at one side of the carrier and beneath it, of means coöperating with the carrier for distributing the buttons carried in its successive recesses in rows across the conveyer.

74. In a distributing mechanism for machines for treating buttons, the combination with a continuously movable member having recesses adapted to receive buttons and a conveyer underlying said member comprising a traveling surface, of a movable distributer forming a support for buttons carried in the recesses of the member and provided with an aperture coöperating successively with the button recesses at the different points in the movement of said member and causing the deposit of buttons in spaced relation across the face of the conveyer.

75. In a distributing mechanism for machines for treating buttons, the combination with a continuously movable member having recesses forming button pockets and a conveying surface underlying and leading from one side of said member, of a movable distributing plate arranged between the latter and the conveyer, having a notch coöperating with the successive button pockets to permit the buttons contained therein to be deposited at various points across the face of the conveyer.

76. In a distributing mechanism for machines for treating buttons, the combination with a rotatable disk having button pockets, of a conveyer leading from one side of the disk arranged beneath the pockets therein and a rotatable plate closing the bottoms of the pockets and having a notch successively coöperating with the pockets to permit the buttons contained therein to be deposited on the conveyer.

77. In a distributing mechanism for machines for treating buttons, the combination with a rotatable member having recesses adapted to receive buttons, of a conveyer underlying said member and a rotatable plate adapted to support buttons contained in said recesses and provided with a notch coöperating successively with the recesses to release the buttons thereon, and differential driving connections between the member and plate.

78. In a distributing mechanism for machines for treating buttons, the combination with a rotatable member having bottomless recesses therein adapted to receive buttons, a segmental track plate underlying said recesses adapted to support buttons therein, and a movable conveyer underlying the rotatable member, of a revoluble disk arranged between the member and conveyer and receiving buttons from the track plate, said disk having a recess coöperating successively with the button pockets at different points in the rotation of the member and permitting buttons therein to be deposited onto the conveyer.

79. In a distributing mechanism for button handling machines, the combination with a carrier having open recesses adapted to receive buttons, a track plate for supporting buttons in the recesses and a conveyer at the end of the track plate, a movable distributer arranged between the carrier and the conveyer supporting the buttons after they leave the track plate and having an aperture coöperating with the recesses in said carrier, of devices for moving the latter continuously in one direction and driving the distributer continuously in the opposite direction.

80. In a button distributing mechanism for button handling machines, the combination with a rotatable disk having open pockets, means for supporting buttons therein during a partial rotation of the disk and a conveyer arranged beneath the latter and leading therefrom, of a distributing disk underlying the first mentioned disk and supporting the buttons in the pockets and provided with a notch uncovering the successive pockets at different points in their rotation across the conveyer, and means for rotating the button pocket disk and the distributing disk in opposite directions at differential speeds.

81. In a distributing mechanism for button handling machines, the combination with a revoluble disk provided with apertures adapted to receive buttons, means for supporting buttons therein during a partial rotation of the disk, and a conveyer extending laterally from one side of the disk, of a circular plate underlying the latter and movable in a direction opposite thereto upon an axis located within the periphery of the disk having a notch registering successively with the button apertures to release the buttons contained therein.

82. The combination with a machine for stenciling buttons, of a distributing mechanism for receiving the stenciled buttons and subsequently depositing them comprising a plate provided with pockets, in which the stenciled buttons are received, open at their lower sides, means for supporting the buttons therein, an underlying plate having an aperture coöperating with the pockets and movable independently of the first-mentioned plate to successively open said pockets and a conveyer receiving the buttons discharged from the pockets.

83. A distributing mechanism for button handling machines, comprising a disk provided with apertures, a conveyer arranged beneath the disk at one side thereof, a track underlying the plate and serving to support buttons in the recesses during a partial revolution of the disk, an underlying circular plate onto which the buttons are carried after leaving the track, having a notch successively uncovering the apertures in the disk and permitting the buttons therein to be deposited on the conveyer.

84. In a distributing mechanism for button handling machines, the combination with a disk movable continuously in one direction having peripheral apertures forming button receiving pockets, of an underlying distributing ring rotating in the opposite direction and journaled upon an axis located at one side of the axis of the disk and normally closing the button pockets at one side thereof, said ring having an aperture coöperating with the successive pockets to release the buttons contained therein, of a conveyer arranged to receive the buttons when so released and means for supporting buttons placed in the pockets during the rotary movement of the disk until said buttons are moved onto the distributing ring.

85. In a button distributing mechanism, the combination with an upper rotatable plate provided with peripheral apertures adapted to receive buttons, of an underlying eccentrically journaled distributing member, arranged with its edge covering a plurality of button apertures and having an aperture to successively uncover the apertures in the plate, and means for driving the two members in opposite directions, of a conveyer extending in a direction away from the coöperating edges of said members, of means for inserting buttons in the apertures of the upper member at a given point thereon and a track for supporting said buttons during the travel from the point of insertion to the point where they are deposited upon the distributing member.

86. In a button stenciling machine, the combination with a carrier having apertured pockets thereon, of a take-off disk having apertures registering with the button pockets, said carrier and disk rotating in parallel planes, of a rotable head provided with radial fingers revolving in a plane at right angles to the planes of the carrier and disk and adapted to successively pass into the button pockets and elevate buttons thereon into apertures of the disk, and a track plate onto which the buttons pass when elevated for supporting them during a partial rotation of the disk, of an endless conveyer leading from one side of and beneath the latter, a movable distributing plate arranged between the conveyer and the disk and normally closing the apertures therein and coöperating successively therewith to release buttons carried in said apertures and deposit them on the conveyer.

87. In a button handling machine, the combination with a carrier having apertured button seats, of a take-off plate arranged above the latter having apertures registering with the button seats, of yieldingly supported centering devices arranged in said apertures, elevating devices for raising the buttons from their seats into engagement with the centering devices, means intercepting the path of the button when elevated and supporting it upon the continued movement imparted thereto by the centering devices, and means for simultaneously moving the take-off disk and the carrier.

88. In a machine for handling buttons, the combination with a carrier having pockets, a take-off disk overlapping the carrier and having apertures adapted to register with said pockets, and means for simultaneously moving said carrier and disk, of yieldingly movable centering devices arranged in each of said apertures, a relatively stationary track for raising the said centering devices out of operative position during a portion of the rotation of said disk, means for discharging buttons from their pockets into the apertures of the disk, and a track plate engaging and supporting the buttons in said recesses.

89. In a machine for operating on buttons, the combination with a carrier having button seats, a take-off disk having apertures adapted to receive the buttons from the seats of the carrier, yielding centering devices on the disk coöperating with the buttons and means holding the latter in the apertures of the disk during a partial rotation of the latter, of yielding strikers adapted to rap said centering devices, a conveyer extending laterally from the disk and a distributer coöperating with the latter and adapted to successively uncover the apertures in said disk and to release the strikers simultaneously therewith.

90. In a feeding mechanism for machines for treating buttons, the combination with a rotatable head, of a button picking device thereon comprising a vertically movable and rotatable member provided with eye-points, a button holder underlying said member and means for supplying buttons thereto, means for rotating the picking device continuously during the rotary movement of the head, a stripper adapted to discharge the button from the picker and means for moving it longitudinally of the latter.

91. In a feeding mechanism for machines for treating buttons, the combination with a rotatable head, a vertically movable shaft guided thereon having members adapted to engage a button, and means for depositing buttons beneath said shaft at one point in the revolution of the head, of a stripping member movable longitudinally of said shaft, means controlling its operation and releasing it to discharge a button at another point in the revolution of the head to disengage the buttons from the engaging members.

92. In a feeding mechanism for machines for treating buttons, the combination with a rotatable head, a shaft having eye-points on its lower end and means for elevating the shaft to position it above a button, of means for rotating it to seat said points in the eyes of the button, a stripper adapted to coöperate with the latter and a cam controlling its movement at a predetermined point in the rotation of the head.

93. In a feeding mechanism for machines for treating buttons, the combination with a rotatable head, of a continuously rotating shaft provided with pickers adapted to engage a button and a member for stripping the latter from the pickers, of a cam controlling the operation of the strippers at one point in the revolution of the head, and for elevating said stripper and the shaft at another point in the revolution of the head and means for depositing a button beneath the shaft when in the elevated position.

94. In a feeding mechanism for treating buttons, the combination with a rotatable head provided with a lip having an aperture for receiving a button, of a shaft guided on the head above the aperture and movable vertically relatively thereto and provided with means for engaging a button, of a stripper movable longitudinally of the shaft adapted to disengage a button therefrom, a stationary cam controlling the longitudinal movement of the stripper and shaft, and means for supporting the button in the aperture of the lip during a partial revolution of the head.

95. In a feeding mechanism for machines for treating buttons, the combination with a rotatable head, an apertured lip thereon and a segmental support underlying said aperture, of a shaft arranged above the aperture provided with adjustable eye-points adapted to coöperate with the eyes of a button, a stripper sleeve surrounding the shaft movable longitudinally thereof, means controlling the movement of the sleeve to eject buttons through the lip aperture when the latter has passed off from said support.

96. In a button stenciling machine, the combination with a traveling carrier adapted to receive buttons, of a head and picking devices carried thereon adapted to pick up buttons, means for rotating said head to position the picking devices over the carrier and means discharging the buttons carried by the picking devices onto the carrier.

97. In a button handling machine, the combination with a carrier and a head moving in unison therewith, of picking devices rotating with the head and passing over the carrier, means for operating the picking devices in one position of the head to pick up buttons and to discharge the latter onto the carrier when said devices are in a position above the carrier.

98. In a machine for treating buttons, the combination with an endless and continuously movable carrier, a head rotating in unison therewith and a plurality of circumferentially disposed picking devices on the head, which successively pass over the carrier, of means for operating each of said picking devices in one position of the head to engage successive buttons and operating to discharge said buttons successively onto the carrier when brought into a predetermined position thereover.

99. In a feeding mechanism for button handling machines, the combination with a rotatable head, a stationary cam member, a picker shaft journaled on the head and a projection coöperating with the cam for raising and lowering said shaft, of means for rotating the latter during the rotary movement of the head, a stripper movable longitudinally of the shaft and also controlled by the cam.

100. In a feeding mechanism for button handling machines, the combination with a head, a shaft movable longitudinally thereon and a sleeve surrounding the shaft, of a cam coöperating with the sleeve and having high and low portions for retracting the sleeve in one position of the head and allowing it to be projected in another position thereof, connections between the sleeve and shaft for raising and lowering the latter, and means mounted on the shaft for engaging and transporting a button.

101. In a feeding mechanism for button handling machines, the combination with a revoluble head, a plurality of picker shafts mounted thereon and movable longitudinally thereof provided with button engaging devices upon their lower ends, a stripper member for each of said shafts adapted to coöperate with a button carried thereon and connections between said strippers and their respective shafts for effecting the longitudinal movement of the latter, of a stationary cam coöperating with the strippers having a high point for effecting their elevation and their shafts in one position of the head and a depressed portion permitting the downward movement of the sleeves and shafts in another position of the head, and coöperating stop members on the head and shafts limiting the movement of the latter relatively to the strippers when the latter are in their lowermost position.

102. In a feeding mechanism for button handling machines, the combination with a hollow revoluble head, of a stationary cam arranged within the head, stripper members guided on the latter and coöperating with the cam and by it moved upwardly and downwardly during the rotary movement of the head, of shafts also guided on the head and moved upwardly and downwardly by the strippers, coöperating stops on each shaft and head for limiting the downward movement of the shafts relatively to the strippers, means for rotating said shafts during the rotary movement of the head and picking devices carried on the lower ends of the shafts and adapted to engage buttons.

103. In a feeding mechanism for button handling machines, the combination with a standard provided with a segmental button supporting flange and a tubular head journaled on the standard above the flange and having an apertured lip arranged in proximity to the latter, the apertures therein forming button receiving pockets, of vertically movable shafts arranged above said pockets provided with picking devices adapted to engage buttons in said apertures, and means for supplying buttons thereto in one position of rotation of the head, strippers adapted to coöperate with said pickers to discharge buttons therefrom, and means for controlling their operation in another position in the rotary movement of said head.

104. In a feeding mechanism for button handling machines, the combination with a support comprising a segmental flange, of a head journaled on the support provided with a lip overlying said flange having apertures forming button receiving pockets, button picking devices on the head adapted to move into and out of said pockets and to engage the buttons therein, a button hopper arranged above the head, selecting devices therein and a discharge chute leading therefrom to a position above the path of movement of said pockets, means for rotating the head and driving connections between it and the selecting mechanism of the hopper.

105. In a feeding mechanism for button handling machines, the combination with a tubular support, a head revoluble thereon having a portion provided with apertures forming button receiving pockets and having a button picking mechanism adapted to engage buttons in said pockets, of means for projecting and retracting said mechanism during the rotary movement of the head, a drive shaft journaled in the support and a driving connection between it and the head.

106. In a feeding mechanism for button handling machines, the combination with a support and a hollow revoluble head journaled thereon, a stationary cam and stationary gear wheel on the support within the head, of a shaft journaled on the exterior of the head provided with a pinion meshing with the gear wheel, picking members on the end of the shaft adapted to engage a button and a stripping member on the head movable longitudinally of the shaft and provided with a projection engaging said cam, coöperating stop members on the stripper and shaft for moving the latter with the stripper and coöperating stop members between the shaft and head for limiting its movement in one direction and permitting the independent movement of the stripper.

107. In a feeding mechanism for button handling machines, the combination with a movable head having a recess adapted to receive a button and a shaft guided on the head movable toward and from a button in the recess, of projections on the end of the shaft adapted to coöperate with the eyes of a button and means for rotating said shaft during the movement of the head.

108. In a feeding mechanism for button handling machines, the combination with a head having a recess adapted to receive a button and a shaft guided thereon and movable toward and from a button in said recess, of adjustable members arranged at the lower end of the shaft having points adapted to enter the eyes of a button, means extending longitudinally of the shaft for adjusting said members and means for rotating the shaft when in engagement with a button.

109. In a feeding mechanism for button handling machines, the combination with a movable head having a recess adapted to receive a button, a shaft guided on the head and movable lengthwise in a direction toward and from said recess and adjustable projections on its lower end adapted to engage the eyes of a button, of a stripper sleeve surrounding the shaft, means for moving it longitudinally of the shaft during the movement of the head and means for rotating the shaft.

110. In a feeding mechanism for machines for handling buttons, the combination with a support having a flange cut-away at one side, and a button carrying disk arranged with its edge in the cut-away portion of said flange and provided with spaced button seats in said edge, a rotatable head arranged above said flange having a lip provided with a recess forming a button pocket and means for rotating the head to carry said pocket into a position above the button seats on the disk, of means for delivering buttons into the said recess at one point in the rotation of the head, button picking devices coöperating with a button in the recess during the movement of the head and seize the latter and support it while said recess travels off from the flange to a position above the disk and a stripper adapted to coöperate with the button to position it on a seat on the disk when in alinement therewith.

111. In a button stenciling machine, the combination with a movable carrier adapted to receive buttons and stencils coöperating with the latter, of a nozzle adapted to spray pigment onto the stencils, a cleaning member arranged in the nozzle, a lever for operating it and means for periodically actuating the lever relatively to the movement of the button carrier.

112. In a button stenciling machine, the combination with a carrier adapted to receive buttons and stencils coöperating with the latter, a spraying nozzle for applying liquid stenciling material to the stencils provided with a valve seat, a valve rod having a valve head adapted to coöperate with said seat and provided with a cleaning pin adapted to coöperate with the orifice of the nozzle, a lever for operating the valve stem and means for driving the carrier, a cam operated by said means, regulating devices controlled by the cam and governing the movement of the valve rod lever to normally retain the valve rod retracted and periodically permit its movement to close and clean out the tip of the nozzle.

HERBERT HASTINGS.

Witnesses:
G. WILLARD RICH,
RUSSELL B. GRIFFITH.